US012759087B2

(12) United States Patent
Saito et al.

(10) Patent No.: US 12,759,087 B2
(45) Date of Patent: Oct. 13, 2026

(54) GLASS PLATE PROCESSING METHOD AND GLASS PLATE

(71) Applicant: AGC Inc., Tokyo (JP)

(72) Inventors: Isao Saito, Tokyo (JP); Takuma Fujiwara, Tokyo (JP); Jun Ito, Tokyo (JP); Ikuo Nagasawa, Tokyo (JP); Takeaki Ono, Tokyo (JP)

(73) Assignee: AGC INC., Tokyo (JP)

( * ) Notice: Subject to any disclaimer, the term of this patent is extended or adjusted under 35 U.S.C. 154(b) by 1069 days.

(21) Appl. No.: 17/747,971

(22) Filed: May 18, 2022

(65) Prior Publication Data

US 2022/0274211 A1 Sep. 1, 2022

Related U.S. Application Data

(63) Continuation of application No. PCT/JP2020/041372, filed on Nov. 5, 2020.

(30) Foreign Application Priority Data

Nov. 21, 2019 (JP) ................................ 2019-210499

(51) Int. Cl.
*B23K 26/53* (2014.01)
*B23K 26/00* (2014.01)
(Continued)

(52) U.S. Cl.
CPC .......... *B23K 26/53* (2015.10); *B23K 26/0006* (2013.01); *B23K 26/0604* (2013.01); *B23K 26/0738* (2013.01); *B23K 2103/54* (2018.08)

(58) Field of Classification Search
CPC ............ B23K 2103/54; B23K 26/0006; B23K 26/0604; B23K 26/0624; B23K 26/0738;
(Continued)

(56) References Cited

U.S. PATENT DOCUMENTS 5,939,175 A 8/1999 Sugiura
6,096,405 A 8/2000 Takahashi et al.
(Continued)

FOREIGN PATENT DOCUMENTS

CN 107848861 A 3/2018
CN 108698900 A 10/2018
(Continued)

OTHER PUBLICATIONS

International Searching Authority, "International Search Report," issued in connection with International Patent Application No. PCT/JP2020/041372, dated Jan. 12, 2021.
(Continued)

*Primary Examiner* — Woody A Lee, Jr.
*Assistant Examiner* — Adam M Eckardt
(74) *Attorney, Agent, or Firm* — Foley & Lardner LLP

(57) ABSTRACT

A glass plate processing method for dividing a glass plate by a separation line that divides a main surface of the glass plate into two regions, includes: moving an irradiation point of a first laser beam along the separation line, and forming a crack extending from the separation line diagonally with respect to the main surface, in a cross-section orthogonal to the separation line; after the crack is formed, moving an irradiation point of a second laser beam along the separation line, and forming a modified portion, in the cross-section, on a virtual line extending in a direction perpendicular to the main surface, from a tip of the crack towards a center of a thickness of the glass plate; and after the modified portion is formed, applying stress to the glass plate and forming a new crack spanning from the tip of the crack to the modified portion.

10 Claims, 17 Drawing Sheets

(51) Int. Cl.
*B23K 26/06* (2014.01)
*B23K 26/073* (2006.01)
*B23K 103/00* (2006.01)

(58) Field of Classification Search
CPC ...... B23K 26/082; B23K 26/53; B23K 26/00; B23K 26/06; B23K 26/073; C03B 33/09; C03C 19/00
See application file for complete search history.

(56) References Cited

U.S. PATENT DOCUMENTS

| | | | |
|---|---|---|---|
| 10,442,719 | B2 * | 10/2019 | Marjanovic .......... B23K 26/361 |
| 10,807,902 | B2 * | 10/2020 | Plapper .................... B24D 3/00 |
| 12,077,465 | B2 * | 9/2024 | Azuma ............... C03B 33/0222 |
| 2004/0248017 | A1 | 12/2004 | Ohtaguro et al. |
| 2013/0126573 | A1 | 5/2013 | Hosseini et al. |
| 2014/0036338 | A1 | 2/2014 | Bareman et al. |
| 2014/0147624 | A1 | 5/2014 | Streltsov et al. |
| 2015/0034613 | A1 | 2/2015 | Hosseini |
| 2015/0038313 | A1 | 2/2015 | Hosseini |
| 2015/0165548 | A1 | 6/2015 | Marjanovic et al. |
| 2015/0217400 | A1 * | 8/2015 | Yamada ................ B23K 26/53 225/2 |
| 2016/0282527 | A1 | 9/2016 | Saito et al. |
| 2017/0001900 | A1 | 1/2017 | Marjanovic et al. |
| 2017/0008793 | A1 * | 1/2017 | Bankaitis .............. C03B 33/091 |
| 2018/0134606 | A1 | 5/2018 | Wagner et al. |
| 2018/0370840 | A1 | 12/2018 | Plapper et al. |
| 2019/0094604 | A1 | 3/2019 | Inoue et al. |
| 2020/0324368 | A1 | 10/2020 | Hosseini |
| 2020/0407263 | A1 | 12/2020 | Plapper et al. |

FOREIGN PATENT DOCUMENTS

| | | | |
|---|---|---|---|
| JP | H09-278466 | A | 10/1997 |
| JP | H09-278467 | A | 10/1997 |
| JP | 2003-228814 | A | 8/2003 |
| JP | 2005-300566 | A | 10/2005 |
| JP | 2017-511777 | A | 4/2017 |
| JP | 2017-185547 | A | 10/2017 |
| JP | 2017-221977 | A | 12/2017 |
| JP | 2019-511989 | A | 5/2019 |
| TW | 201433554 | A | 9/2014 |
| TW | 201536461 | A | 10/2015 |
| TW | I592244 | B | 7/2017 |
| WO | WO-2010/104039 | A1 | 9/2010 |
| WO | WO-2012/063348 | A1 | 5/2012 |
| WO | WO-2014/058354 | A1 | 4/2014 |
| WO | WO-2015/095089 | A2 | 6/2015 |
| WO | WO-2015/098641 | A1 | 7/2015 |
| WO | WO-2017/208995 | A1 | 12/2017 |

OTHER PUBLICATIONS

International Searching Authority, “Written Opinion,” issued in connection with International Patent Application No. PCT/JP2020/041372, dated Jan. 12, 2021.

* cited by examiner

GLASS PLATE PROCESSING METHOD AND GLASS PLATE

CROSS-REFERENCE TO RELATED APPLICATION

The present application is a continuation filed under 35 U.S.C. 111(a) claiming the benefit under 35 U.S.C. 120 and 365(c) of PCT International Application No. PCT/JP2020/041372, filed on Nov. 5, 2020, and designating the U.S., which is based on and claims priority to Japanese Patent Application No. 2019-210499, filed on Nov. 21, 2019. The entire contents of PCT International Application No. PCT/JP2020/041372 and Japanese Patent Application No. 2019-210499 are incorporated herein by reference.

BACKGROUND OF THE INVENTION

1. Field of the Invention

This disclosure relates to a glass plate processing method and a glass plate.

2. Description of the Related Art

In Patent Documents 1 and 2, a glass plate is divided, by a separation line that divides the glass plate's main surface into two regions. To be more specific, first, a laser beam is emitted to a point, and, by moving this irradiation point along the separation line, a crack that extends from the separation line diagonally with respect to the main surface is formed in a cross-section that is orthogonal to the dividing line.

In Patent Document 1, the separation line intersects the peripheral edge of the main surface diagonally, and this intersection is the point where the irradiation point starts moving. By this means, a crack that extends from the separation line diagonally with respect to the main surface can be formed in a cross-section that is orthogonal to the separation line.

Meanwhile, in Patent Document 2, the irradiation point has a power density distribution that is asymmetric in the left-right direction. The left-right direction is a direction that runs parallel to the main surface, and that is orthogonal to the separation line. By this means, a crack that extends from the separation line diagonally with respect to the main surface can be formed in a cross-section that is orthogonal to the separation line.

According to Patent Documents 1 and 2, as described above, a crack that extends from the separation line diagonally with respect to the main surface can be formed in a cross-section that is orthogonal to the separation line, so that an inclined surface that is equivalent to a chamfered surface is obtained, which makes chamfering unnecessary.

Meanwhile, in Patent Documents 3 and 4, a laser beam is concentrated in a linear shape inside a glass plate, and forms a linear damaged portion. The linear damaged portion extends in a direction that is perpendicular to a main surface. By forming a crack that starts from the damaged portion, an end surface to extend vertically from the main surface can be obtained.

RELATED-ART DOCUMENT

Patent Document

[Patent Document 1] International Publication No. 2015/098641

[Patent Document 2] International Publication No. 2014/058354

[Patent Document 3] Japanese Unexamined Patent Application Publication (Translation of PCT Application) No. 2019-511989

[Patent Document 4] Japanese Unexamined Patent Application Publication No. 2017-185547

SUMMARY OF THE INVENTION

Problem to be Solved by the Invention

According to Patent Documents 1 and 2, as described above, a crack that extends from the separation line diagonally with respect to the main surface is formed in a cross-section that is orthogonal to the separation line. As a result of this, an inclined surface, which is equivalent to a chamfered surface, can be obtained without performing chamfering.

Now, in Patent Documents 1 and 2, after the crack is formed, stress is applied to the glass plate to create a new crack from the tip of that crack. When doing so, however, the new crack sometimes does not extend in a direction that is perpendicular to the main surface.

By contrast with this, according to Patent Documents 3 and 4, the linear damaged portion extends in a direction that is perpendicular to the main surface. Consequently, if a crack to start from the damaged portion is formed, an end surface to extend vertically from the main surface can be obtained. Nevertheless, since the main surface and the end surface are perpendicular to each other at the corners, chamfering needs to be done.

At least one aspect of the present disclosure provides an art, whereby it is possible to develop a crack in a cross-section that is orthogonal to a separation line on a main surface, in a direction that is perpendicular to the main surface, from the tip of a crack that extends from the separation line diagonally with respect to the main surface.

Means for Solving the Problem

The glass plate processing method according to at least one aspect of the present disclosure is for dividing a glass plate by a separation line that divides a main surface of the glass plate into two regions. This processing method includes following (1) to (3): (1) moving an irradiation point of a first laser beam along the separation line, and forming a crack that extends from the separation line diagonally with respect to the main surface, in a cross-section that is orthogonal to the separation line; (2) after the crack is formed, moving an irradiation point of a second laser beam along the separation line, and forming a modified portion, in the cross-section, on a virtual line that extends in a direction perpendicular to the main surface, from a tip of the crack towards a center of a thickness of the glass plate; and (3) after the modified portion is formed, applying stress to the glass plate and forming a new crack that spans from the tip of the crack to the modified portion.

Effects of the Invention

According to at least one aspect of the present disclosure, it is possible to develop a crack in a cross-section that is orthogonal to a separation line on a main surface, in a direction that is perpendicular to the main surface, from the tip of a crack that extends from the separation line diagonally with respect to the main surface.

DESCRIPTION OF THE PREFERRED EMBODIMENTS

Now, embodiments of the present disclosure will be described below with reference to the accompanying drawings. Note that, in each drawing, the same components or corresponding components may be assigned the same or corresponding reference signs, without further explanation. In this specification, when the symbol "-" is used to represent the range of a numerical value, this symbol covers the upper limit and lower limit of that numerical value.

First Embodiment

Figure 1:
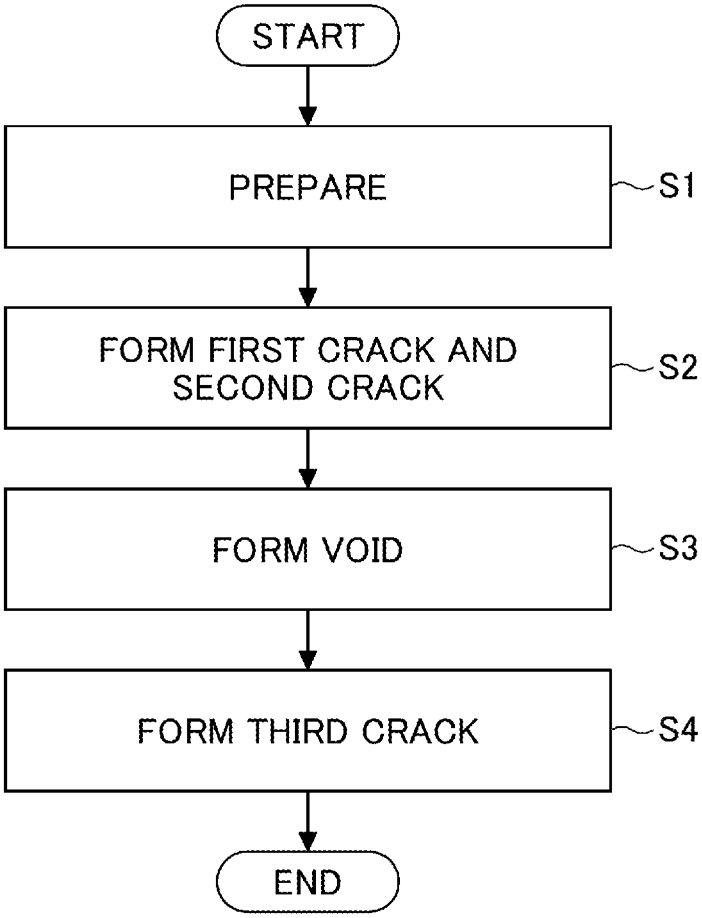
FIG. 1 is a flowchart that shows a glass plate processing method according to a first embodiment.

As shown in FIG. 1, the glass plate processing method includes S1 to S4. Hereinafter, first examples of S1 to S4 of FIG. 1 will be described below with reference to FIGS. 2A to 2E.

Figure 2A:
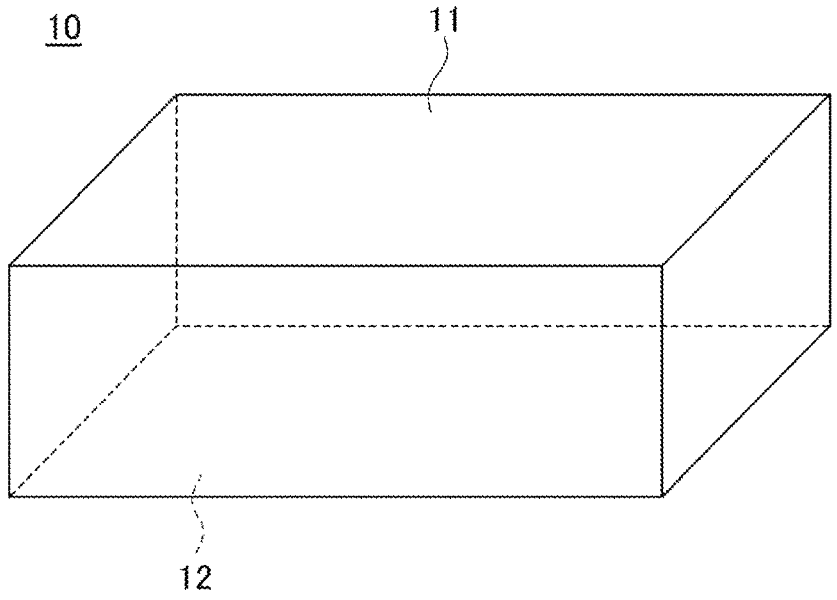
FIG. 2A is a perspective view that shows a first example of S1 in FIG. 1.

First, referring to S1 of FIG. 1, a glass plate 10 is prepared, as shown in FIG. 2A. The glass plate 10 may be a bent plate, but is a flat plate in the present embodiment. The glass plate 10 has a first main surface 11, and a second main surface 12 that is opposite to the first main surface 11.

The shapes of the first main surface 11 and the second main surface 12 are, for example, rectangular. Note that the shapes of the first main surface 11 and the second main surface 12 may be trapezoidal, circular, elliptical, and so forth, and are not particularly limited.

The glass plate 10 is used for or as, for example, an automotive window glass, an instrument panel, a head-up display (HUD), a dashboard, a center console, a cover glass for automotive interior parts such as a shift knob, a building window glass, a display substrate, a cover glass for a display, and so forth. The thickness of the glass plate 10 is appropriately set according to the use of the glass plate 10, and is, for example, 0.01 cm to 2.5 cm.

The glass plate 10 may be laminated with another glass plate via an interlayer, after S1 to S4 in FIG. 1, and used as laminated glass. Also, the glass plate 10 may be subjected to a strengthening process, after S1 to S4 in FIG. 1, and used as strengthened glass.

The glass plate 10 is, for example, soda lime glass, non-alkali glass, chemically-strengthened glass, and so forth. Chemically-strengthened glass is used, for example, as cover glass, after being subjected to chemically-strengthening processing. The glass plate 10 may be thermally-strengthened glass as well.

The glass plate 10 may be subjected to bending forming, after S1 to S4 in FIG. 1.

Figure 2B:
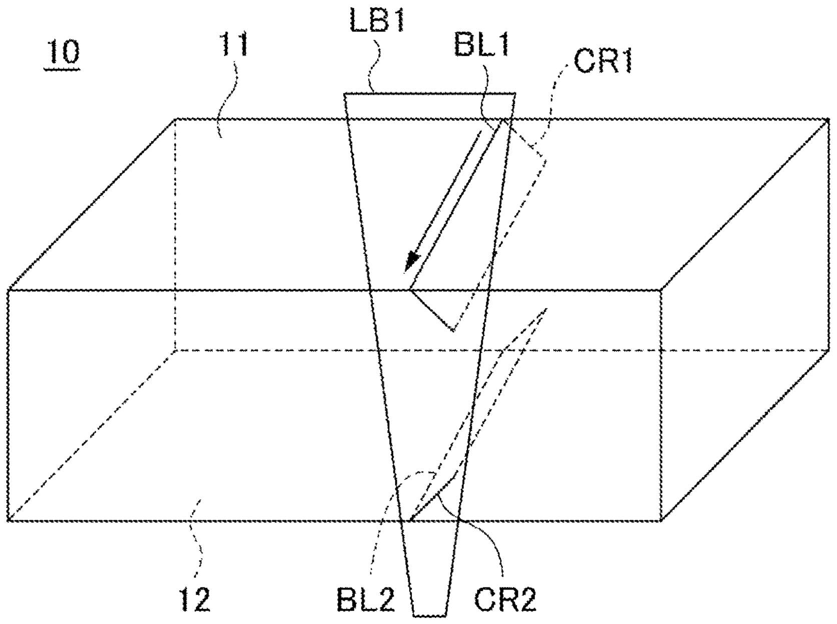
FIG. 2B is a perspective view that shows a first example of S2 in FIG. 1.

Next, referring to S2 in FIG. 1, as shown in FIG. 2B, the irradiation point of a first laser beam LB 1 is moved along a first separation line BL 1, and a first crack CR 1 is formed. The first separation line BL 1 divides the first main surface 11 into two regions. The first crack CR 1, in a cross-section that is orthogonal to the first separation line BL 1, extends from the first separation line BL 1 diagonally with respect to the first main surface 11.

When the first crack CR 1 is formed, a second crack CR 2 is also formed. The second crack is formed along a second separation line BL 2. The second separation line BL 2 divides a second main surface 12 into two regions. The second crack CR 2, in a cross-section that is orthogonal to the second separation line BL 2, extends from the second separation line BL 2 diagonally with respect to the second main surface 12.

The first laser beam LB 1 penetrates the glass plate 10 from the irradiation point on the first main surface 11 to the irradiation point on the second main surface 12. The first crack CR 1 and the second crack CR 2 are formed at the same time by the thermal stress of the glass. As for their forming method, for example, the method described in Patent Document 1 or Patent Document 2 is used.

Note that, in this embodiment, both the first crack CR 1 and the second crack CR 2 are created at the same time by irradiation of the first laser beam LB 1, but it is equally possible to create only one of them. In that case, the first crack CR 1 and the second crack CR 2 may be produced in order. However, it is equally possible to create only one of the first crack CR 1 and the second crack CR 2, and not create the other.

The irradiation of the first laser beam LB 1 upon the glass plate 10 primarily causes linear absorption. To say that linear absorption is primarily caused means that the amount of heat produced by linear absorption is greater than the amount of heat produced by non-linear absorption. Non-linear absorption need not appreciably occur. The heat produced by the first laser beam LB 1 forms the first crack CR 1 and the second crack CR 2.

Non-linear absorption is also referred to as "multiphoton absorption." The likelihood that multiphoton absorption occurs is non-linear with respect to the photon density (the power density of the first laser beam LB 1), and the higher the photon density, the significantly higher is that likelihood. For example, the likelihood that two-photon absorption will occur is proportional to the square of the photon density. At any position on the glass plate 10, the photon density may be less than $1\times10^8$ W/cm$^2$. In this case, little non-linear absorption occurs.

Meanwhile, linear absorption is also referred to as "one-photon absorption." The likelihood that one-photon absorption occurs is proportional to the photon density. In the case of one-photon absorption, the following equation 1 holds in accordance with Lambert-Beer's law:

$$I = I_0 \times \exp(-\alpha \times L) \quad \text{(Equation 1)}$$

In above equation 1, $I_0$ is the intensity of the first laser beam LB 1 on the first main surface 11, I is the intensity of the first laser beam LB 1 on the second main surface 12, L is the propagation distance of the first laser beam LB 1 from the first main surface 11 to the second main surface 12, α is the glass's absorption coefficient for the first laser beam LB 1. α is the absorption coefficient of linear absorption, and is determined by the wavelength of the first laser beam LB 1, the chemical composition of the glass, and so forth.

α×L represents the internal transmittance. The internal transmittance is the transmittance on assumption that the first laser beam LB 1 is not reflected by the first main surface 11. The smaller α×L, the larger the internal transmittance. α×L is, for example, 3.0 or less, more preferably 2.3 or less, even more preferably 1.6 or less. In other words, the internal transmittance is, for example, 5% or higher, preferably 10% or higher, and more preferably 20% or higher. When α×L is 3.0 or less, the internal transmittance is 5% or higher, so that the first main surface 11 and the second main surface 12 are both sufficiently heated.

From the perspective of the efficiency of heating, α×L is preferably 0.002 or greater, more preferably 0.01 or greater, and even more preferably 0.02 or greater. In other words, the internal transmittance is preferably 99.8% or lower, more preferably 99% or lower, even more preferably 98% or lower.

If the temperature of the glass exceeds the annealing point, the glass becomes more prone to plastic deformation, which might limit the generation of thermal stress. Therefore, the beam wavelength, the output, the beam diameter, and so forth on the first main surface 11 are adjusted so that the temperature of the glass stays below the annealing point.

The first laser beam LB 1 is, for example, a continuous wave beam. The light source of the first laser beam LB 1 is not particularly limited, and, for example, a Yb fiber laser may be used. The Yb fiber laser is a Yb-doped optical fiber core, and outputs a continuous wave beam having a wavelength of 1070 nm.

However, the first laser beam LB 1 may be a pulse beam instead of a continuous wave beam.

The first laser beam LB 1 is emitted to the first main surface 11 by an optical system including a condenser lens or the like. By moving that irradiation point along the first separation line BL 1, the first crack CR 1 is formed across the entirety of the first separation line BL 1. In doing this, the second crack CR 2 is also formed across the entirety of the second separation line BL 2.

The irradiation point is moved by using, for example, a 2D galvano scanner or a 3D galvano scanner. Note that the irradiation point may be moved by moving or rotating the stage holding the glass plate 10. For the stage, for example, an XY stage, an XYθ stage, an XYZ stage, or an XYZθ stage is used. The X axis, the Y axis and the Z axis are orthogonal to each other, the X axis and the Y axis are parallel to the first main surface 11, and the Z axis is perpendicular to the first main surface 11.

Figure 2C:
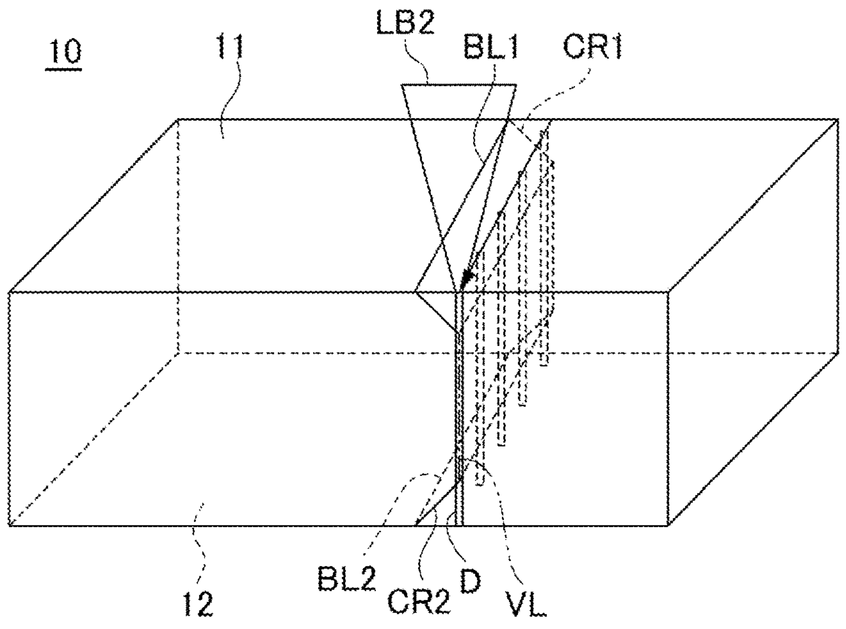
FIG. 2C is a perspective view that shows a first example of S3 in FIG. 1.

Next, in S3 of FIG. 1, as shown in FIG. 2C, the irradiation point of the second laser beam LB 2 is moved along the first separation line BL 1, to form modified portions D. The modified portions D are formed on a virtual line VL, in a cross-section that is orthogonal to the first separation line BL 1. The virtual line VL extends in a direction perpendicular to the first main surface 11, from the tip of the first crack CR 1 to the center of the plate's thickness. The virtual line VL extends in a direction perpendicular to the first main surface 11, from the tip of the first crack CR 1 to the tip of the second crack CR 2.

The second laser beam LB 2 is a pulse beam, and forms the modified portions D by non-linear absorption. For the pulse beam, it is preferable to use a pulse laser beam having a wavelength range of 250 nm to 3000 nm and a pulse width of 10 fs to 1000 ns. A laser beam having a wavelength range of 250 nm to 3000 nm penetrates the glass plate 10 to some extent, so that the modified portions D can be formed by causing non-linear absorption inside the glass plate 10. The wavelength range is preferably 260 nm to 2500 nm. Also, if the pulse laser beam has a pulse width of 1000 ns or less, the photon density can be increased with ease, so that the modified portions D can be formed by causing non-linear absorption inside the glass plate 10. The pulse width is preferably 100 fs to 100 ns. Note that the second laser beam LB 2 may also be a pulse beam that forms multiple beam focal points at the same time in the optical axis direction by means of a multifocal optical system.

In the modified portion D, the density or refractive index of the glass is changed. A modified portion D is a void, a modified layer, or the like. A modified layer is a layer where the density or the refractive index is changed by a structural change, or by melting and resolidification.

The second laser beam LB 2 is concentrated in a linear shape inside the glass plate 10, for example, and forms the modified portions D in a linear shape. The light source of the second laser beam LB 2 may output a set of pulses, referred to as a "burst." One set of pulses includes multiple pulse beams (for example, 3 to 50 pulse beams), and each pulse beam has a pulse width of less than 10 nanoseconds. In one pulse set, the energy of pulse beams may decline gradually.

The pulse beam may be concentrated in a linear shape by self-focusing induced by non-linear Kerr effect. Note that the pulse beam may be concentrated in a linear shape in the optical axis direction by using an optical system. To name a specific example of the optical system, for example, an Axikon lens may be used.

The pulse beam creates the modified portions D. The modified portions D are formed across the entirety of the plate's thickness direction, from the first main surface 11 to the second main surface 12. Note that, although this will be described later again, the modified portions D may be formed only in part in the plate's thickness direction, and may be formed, for example, only on the first main surface 11 side with respect to the center of the plate's thickness.

The light source of the second laser beam LB 2 may include, for example, a Nd-doped YAG crystal (Nd:YAG), and output a pulse beam having a wavelength of 1064 nm. Note that the wavelength of the pulse beam is by no means limited to 1064 nm. Nd; YAG second harmonic laser (wavelength 532 nm), Nd; YAG third harmonic laser (wavelength 355 nm); and so forth may be used as well.

The second laser beam LB 2 is emitted upon the first main surface 11 by an optical system including a condenser lens and the like. By moving that irradiation point along the first separation line BL 1, the modified portions D are formed across the entirety of the first separation line BL 1. When doing so, the modified portions D are formed along the entirety of the second separation line BL 2.

The irradiation point is moved by using, for example, a 2D galvano scanner or a 3D galvano scanner. Note that the irradiation point may be moved by moving or rotating the stage holding the glass plate 10. For the stage, for example, an XY stage, an XYθ stage, an XYZ stage, or an XYZθ stage may be used.

Figure 2D:
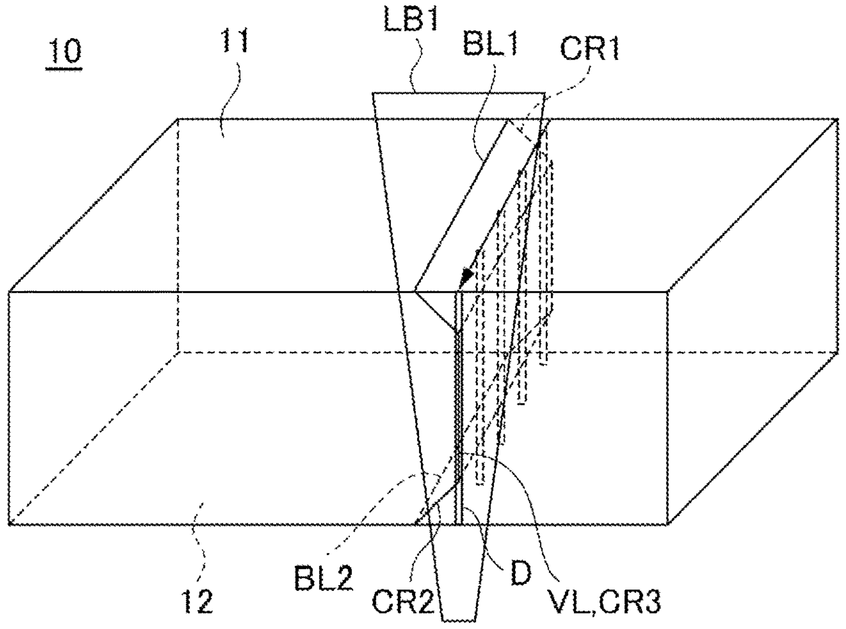
FIG. 2D is a perspective view that shows a first example of S4 in FIG. 1.

Next, in S4 of FIG. 1, as shown in FIG. 2D, stress is applied to the glass plate 10 to form a third crack CR 3 that spans from the tip of the first crack CR 1 to the modified portion D. The third crack CR 3 spans from the tip of the first crack CR 1 to the tip of the second crack CR 2.

To create the third crack CR 3, for example, the irradiation point of the first laser beam LB 1 is moved again along the first separation line BL 1, and thermal stress is applied to the glass plate 10. Note that a roller may be pressed against the glass plate 10 and moved along the first separation line BL 1, and apply stress to the glass plate 10.

According to the first example, the modified portions D are formed on the virtual line VL before the third crack CR 3 is formed. Unlike the extension of the first crack CR 1 and the extension of the second crack CR 2, the virtual line VL extends perpendicularly with respect to the first main surface 11 and the second main surface 12. The modified portions D guide the third crack CR 3 to the virtual line VL. Therefore, it is possible to create the third crack CR 3, from the tips of the first crack CR 1 and the second crack CR 2, in a direction that is perpendicular to the first main surface 11 and the second main surface 12.

Figure 2E:
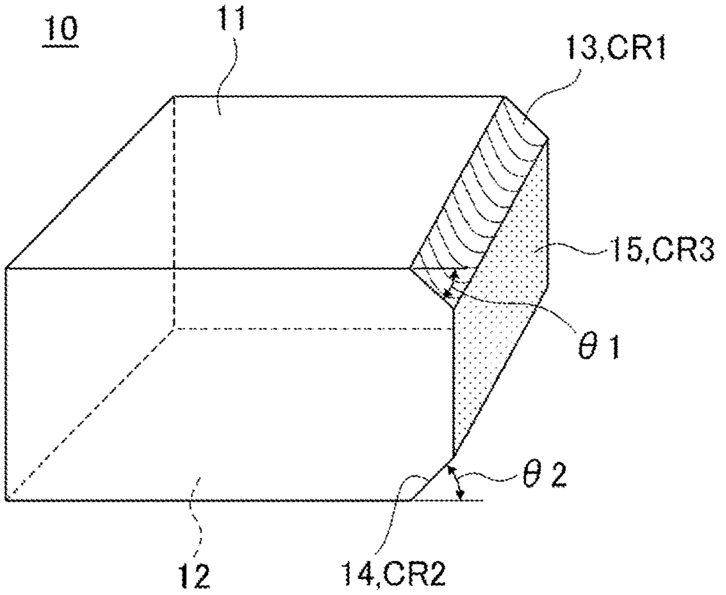
FIG. 2E is a perspective view that shows a first example of a glass plate obtained after S4 in FIG. 1.

After S4 in FIG. 1, the glass plate 10 shown in FIG. 2E is obtained. The glass plate 10 has the first main surface 11, the second main surface 12, a first inclined surface 13, a second inclined surface 14, and an end surface 15. The second main surface 12 is opposite to the first main surface 11.

The first inclined surface 13 may be equivalent to and referred to as a "chamfered surface." The first inclined surface 13 intersects the first main surface 11 at an obtuse angle, in a cross-section that is orthogonal to the peripheral edge of the first main surface 11. The internal angle between the first inclined surface 13 and the first main surface 11 is the obtuse angle. The outer angle θ1 between the first inclined surface 13 and the first main surface 11 is, for example, 20 degrees to 80 degrees, preferably 30 degrees to 60 degrees.

Meanwhile, the second inclined surface 14 intersects the second main surface 12 at an obtuse angle, in a cross-section that is orthogonal to the peripheral edge of the second main surface 12. The internal angle between the second inclined surface 14 and the second main surface 12 is the obtuse angle. The outer angle θ2 between the second inclined surface 14 and the second main surface 12 is, for example, 20 degrees to 80 degrees, preferably 30 degrees to 60 degrees.

The first inclined surface 13 is created by the first crack CR 1. The first crack CR 1, following the movement of the irradiation point of the first laser beam LB 1, develops in the direction of that movement. Therefore, the first inclined surface 13 includes Wallner lines or Arrest lines. A "Wallner line" is a striped line that indicates the direction in which a crack develops. An "Arrest line" is a striped line that indicates a pause in a crack's development. Note that, similar to the first inclined surface 13, the second inclined surface 14 also includes Wallner lines or Arrest lines.

From the perspective of improving the breaking strength of the glass plate 10, the arithmetic average roughness Ra of the first inclined surface 13 is, for example, less than 0.1 μm, preferably 50 nm or less, and more preferably 10 nm or less. The arithmetic average roughness Ra of the first inclined surface 13 is, for example, 1 nm or greater, preferably 2 nm or greater. The arithmetic average roughness Ra is measured in accordance with Japanese Industrial Standards JIS B0601: 2013. The arithmetic average roughness Ra of the second inclined surface 14 is the same as the arithmetic average roughness Ra of the first inclined surface 13. The breaking strength of the glass plate 10 improves as long as the arithmetic average roughness Ra of the first inclined surface 13 of the glass plate 10 and/or the arithmetic average roughness Ra of the second inclined surface 14 are in the above range. In particular, it is preferable when using the glass plate 10 for a window glass for an automobile or a cover glass for automotive interior parts.

The end surface 15 extends from the respective tips of the first inclined surface 13 and the second inclined surface 14, in a direction perpendicular to the first main surface 11. Here, "a direction perpendicular to the first main surface 11" refers to any direction in which the angle formed with the normal to the first main surface 11 is 10 degrees or less.

The end surface 15 is created by the third crack CR 3, and matches with the virtual line VL. The virtual line VL is a straight line in the cross-section orthogonal to the peripheral edge of the first main surface 11, but may also be a rounded, curved line, as will be described later.

The end surface 15 includes the modified portions D formed on the virtual line VL, and therefore has a larger arithmetic average roughness Ra than the first inclined surface 13 and the second inclined surface 14. The arithmetic average roughness Ra of the end surface 15 is, for example, 0.1 μm or greater, preferably 0.2 μm or greater. When the arithmetic average roughness Ra of the end surface is 0.1 μm or greater, it is possible to reduce the slippage when holding the end surface 15. The arithmetic average roughness Ra of the end surface 15 is, for example, 5 μm or less, preferably 3 μm or less.

Next, second examples of S3 and S4 of FIG. 1 will be described with reference to FIGS. 3A and 3B. Note that the glass plate 10 obtained after the second example of S4 is the same as the glass plate 10 obtained after the first example of S4, and therefore its illustration is omitted here. Now, the differences from the first example will be primarily described below.

Figure 3A:
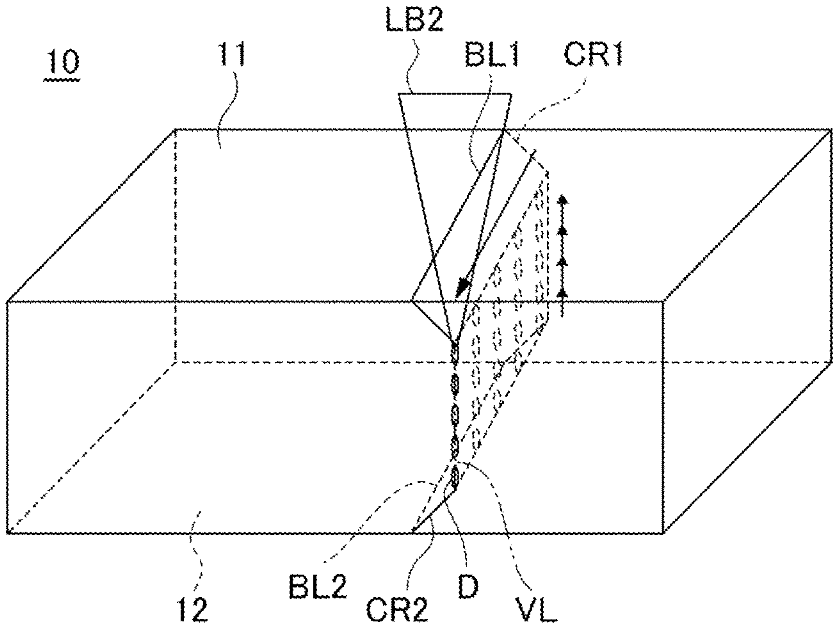
FIG. 3A is a perspective view that shows a second example of S3 in FIG. 1.

As shown in FIG. 3A, in S3 of FIG. 1, the second laser beam LB 2 may be focused in a dot-like shape inside the glass plate 10 to form the modified portion D in a dot-like shape. The light source of the second laser beam LB 2 outputs a single pulse beam or a set of pulses.

The beam wavelength, the pulse width, and so forth are adjusted so that multiphoton absorption occurs only near the beam focal point.

The light source of the second laser beam LB 2 may include, for example, an Nd-doped YAG crystal (Nd:YAG), and output a pulse beam having a wavelength of 1064 nm. Note that the wavelength of the pulse beam is not limited to 1064 nm. Nd; YAG second harmonic laser (wavelength 532 nm), Nd; YAG third harmonic laser (wavelength 355 nm), and so forth can also be used.

The second laser beam LB 2 is focused in a dot-like shape by an optical system including a condenser lens and the like. A distribution of modified portions D is arranged by repeating moving the beam focal point two-dimensionally within a plane at a certain depth from the first main surface 11 and changing the depth of the beam focal point from the first main surface 11. The beam focal point is moved by using, for example, a 3D galvano scanner. If the depth of the beam focal point is changed by moving the stage, a 2D galvano scanner may be used.

The stage holds the glass plate 10. The beam focal point may be moved by moving or rotating the stage holding the glass plate 10. For the stage, for example, an XY stage, an XYG stage, an XYZ stage, or an XYZG stage is used. The X axis, the Y axis and the Z axis are orthogonal to each other, the X axis and the Y axis are parallel to the first main surface 11, and the Z axis is perpendicular to the first main surface 11.

The modified portions D are formed across the entirety of the plate's thickness direction, from the tip of the first crack CR 1 to the tip of the second crack CR 2. Note that, although this will be described later again, the modified portions D may be formed only in part in the plate's thickness direction, and may be formed, for example, only on the first main surface 11 side with respect to the center of the plate's thickness.

Figure 3B:
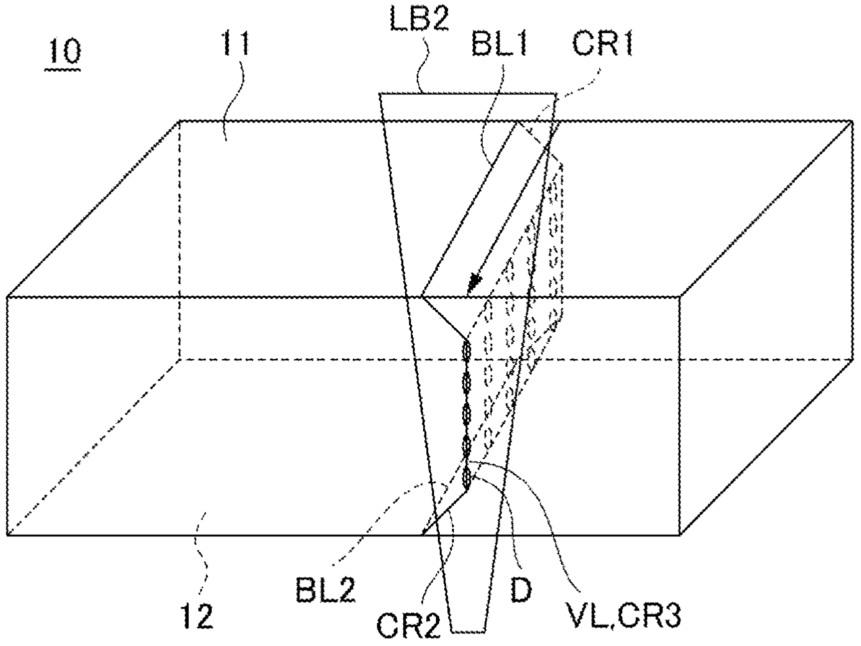
FIG. 3B is a perspective view that shows a second example of S4 in FIG. 1.

Next, as shown in FIG. 3B, in S4 of FIG. 1, stress is applied to the glass plate 10 to form a third crack CR 3 that spans from the tip of the first crack CR 1 to the modified portions D. The third crack CR 3 spans from the tip of the first crack CR 1 to the tip of the second crack CR 2.

According to the second example, as in the first example, the modified portions D are formed on the virtual line VL before the third crack CR 3 is formed. The modified portions D guide the third crack CR 3 to the virtual line VL. This makes it possible to create the third crack CR 3, from the tips of the first crack CR 1 and the second crack CR 2, in a direction that is perpendicular to the first main surface 11 and the second main surface 12.

Next, third examples of S3 and S4 of FIG. 1 will be described with reference to FIGS. 4A and 4B. Now, the differences from the first example and the second example will be primarily described.

Figure 4A:
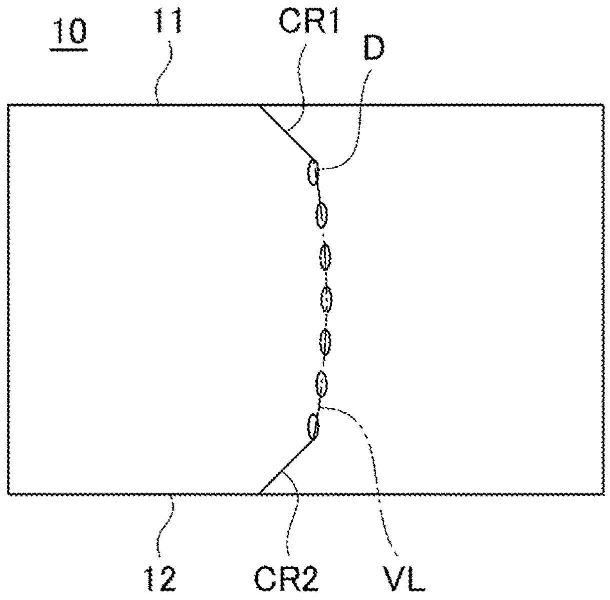
FIG. 4A is a cross-sectional view that shows a third example of S3 in FIG. 1.

In S3 of FIG. 1, as shown in FIG. 4A, the virtual line VL is a rounded curve. It suffices if the angle formed between the tangent to the curve and the normal to the first main surface 11 is 10 degrees or less. Multiple modified portions D are aligned on the virtual line VL.

Figure 4B:
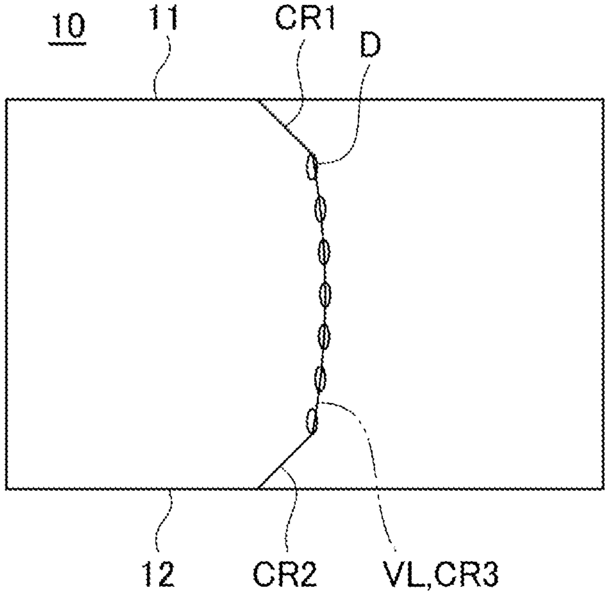
FIG. 4B is a cross-sectional view that shows a third example of S4 in FIG. 1.

Next, as shown in FIG. 4B, in S4 of FIG. 1, stress is applied to the glass plate 10 to form the third crack CR 3 that spans from the tip of the first crack CR 1 to the modified portions D. As a result of this, the third crack CR 3 spans from the tip of the first crack CR 1 to the tip of the second crack CR 2.

According to the third example, as in the first example, the modified portions D are formed on the virtual line VL before the third crack CR 3 is formed. The modified portions D guide the third crack CR 3 to the virtual line VL. This makes it possible to create the third crack CR 3, from the tips of the first crack CR 1 and the second crack CR 2, in a direction that is perpendicular to the first main surface 11 and the second main surface 12.

Second Embodiment

Figure 5:
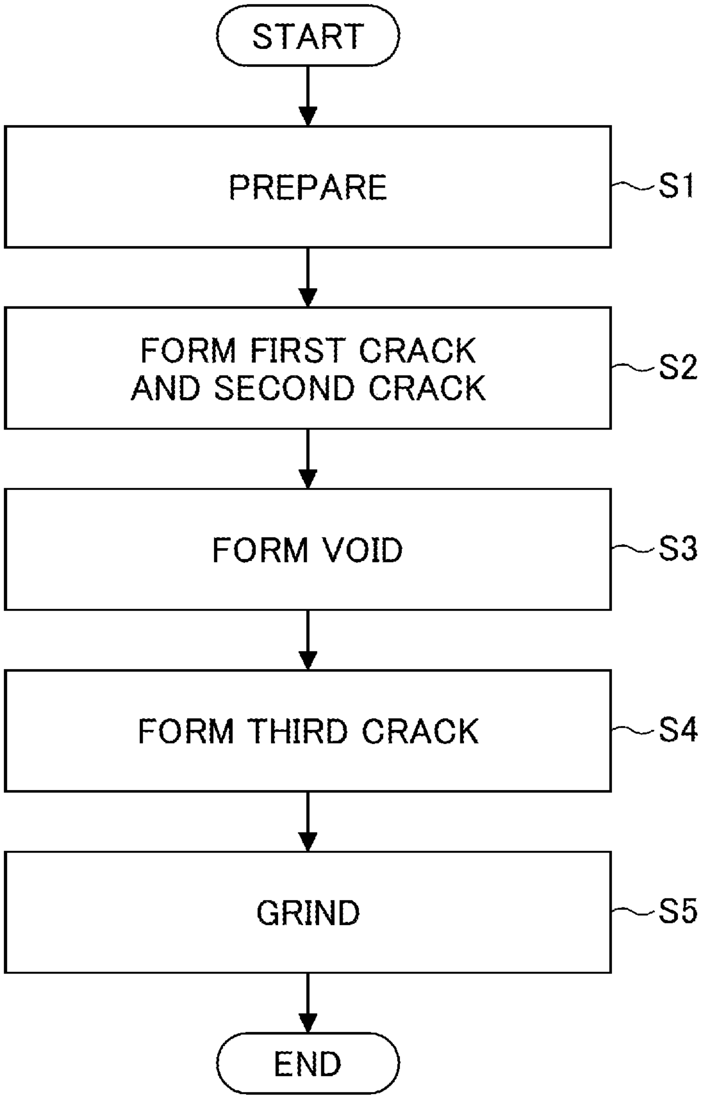
FIG. 5 is a flowchart that shows a glass plate processing method according to a second embodiment.

Now, as shown in FIG. 5, the glass plate processing method may further include S5, in addition to S1 to S4. Below, S3 to S5 of FIG. 5 will be described with reference to FIGS. 6A to 6E. Note that S1 and S2 in FIG. 5 are the same as S1 and S2 in FIG. 1, and therefore their description will be omitted here.

Figure 6A:
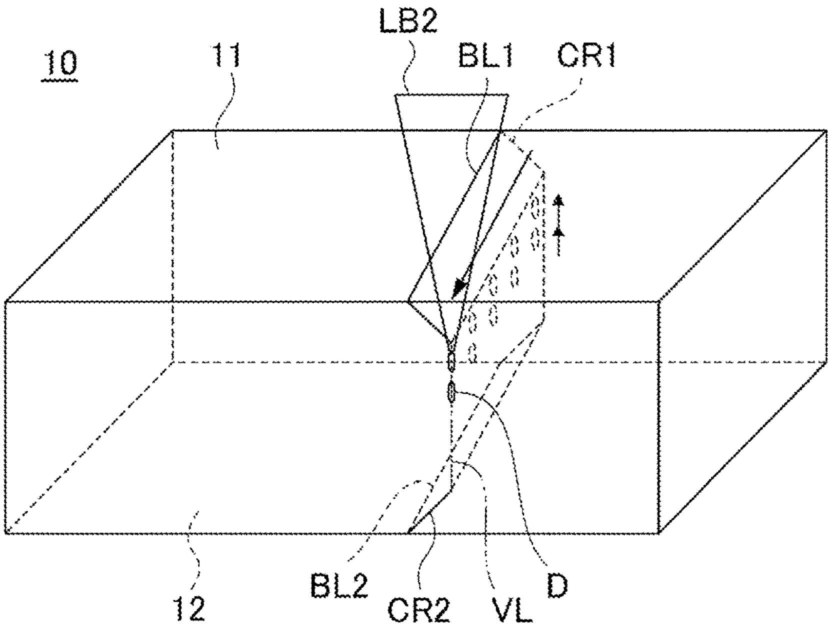
FIG. 6A is a perspective view that shows S3 of FIG. 5.

First, as shown in FIG. 6A, in S3 of FIG. 5, the second laser beam LB 2 may be focused in a dot-like shape inside the glass plate 10 to form the modified portions D in a dot-like shape. The modified portions D are formed only on the first main surface 11 side with respect to the center of the plate thickness of the glass plate 10.

Figure 6B:
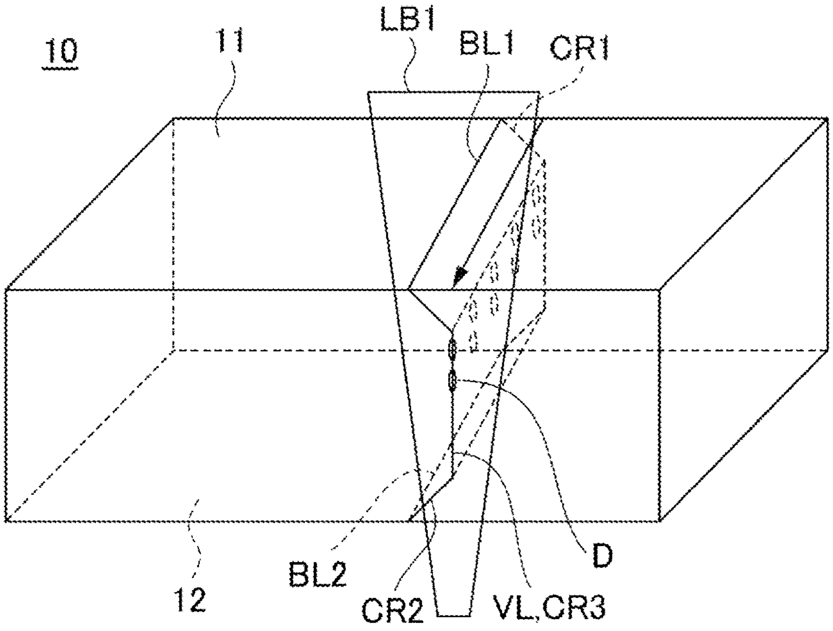
FIG. 6B is a perspective view that shows S4 of FIG. 5.

Next, as shown in FIG. 6B, in S4 of FIG. 5, stress is applied to the glass plate 10 to form the third crack CR 3 that spans from the tip of the first crack CR 1 to the modified portions D. As a result of this, the third crack CR 3 spans from the tip of the first crack CR 1 to the tip of the second crack CR 2.

Figure 6C:
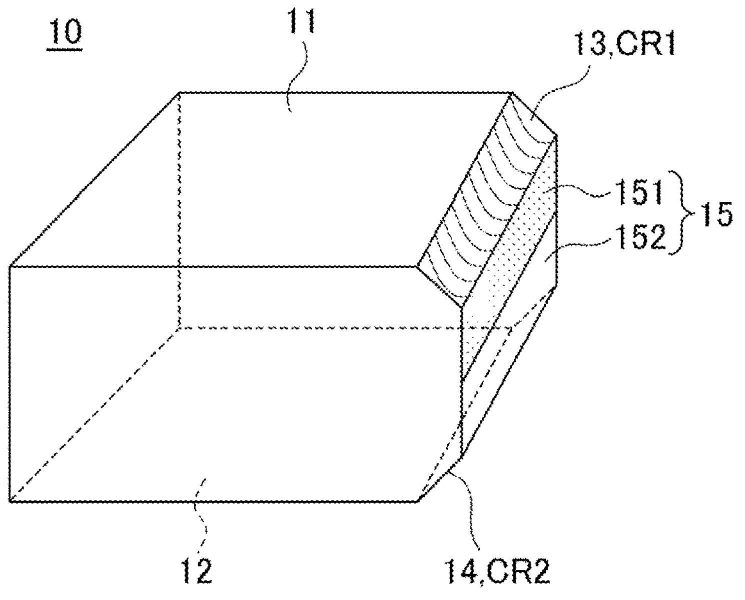
FIG. 6C is a perspective view that shows a glass plate obtained after S4 in FIG. 5.

After S4 in FIG. 5, the glass plate 10 shown in FIG. 6C is obtained. The glass plate 10 has the first main surface 11, the second main surface 12, the first inclined surface 13, the second inclined surface 14, and the end surface 15. From the perspective of surface roughness Ra, the end surface 15 is divided into a first end surface portion 151, which is the first main surface 11 side with respect to the center of the plate's thickness, and a second end surface portion 152, which is the second main surface 12 side.

The first end surface portion 151 includes the modified portions D. Consequently, the arithmetic average roughness Ra of the first end surface portion 151 is, for example, 0.1 μm or greater, preferably 0.2 μm or greater. The arithmetic average roughness Ra of the first end surface portion 151 is, for example, 5 μm or less, preferably 3 μm or less.

On the other hand, the second end surface portion 152 does not include the modified portions D. Consequently, the arithmetic average roughness Ra of the second end surface portion 152 is, for example, less than 0.1 μm, preferably 50 nm or less, and more preferably 10 nm or less. The arithmetic average roughness Ra of the second end surface portion 152 is, for example, 1 nm or greater, preferably 2 nm or greater.

Figure 6D:
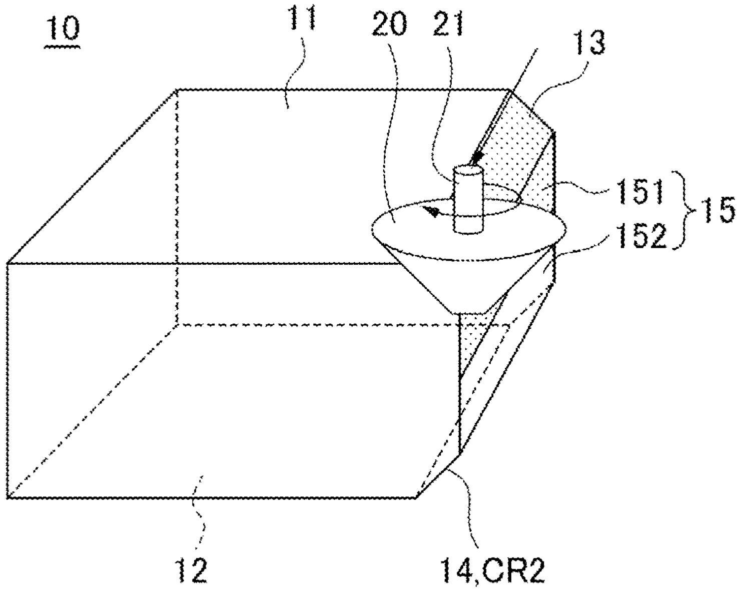
FIG. 6D is a perspective view that shows S5 of FIG. 5.

Next, as shown in FIG. 6D, in S5 of FIG. 5, the first inclined surface 13 is ground with a grindstone 20. This can make the first inclined surface 13 rough. The grindstone 20 is a truncated cone, symmetrical about the rotation axis 21, and moves along the peripheral edge of the first main surface 11 by rotating about the rotation axis 21.

The average particle size D50 of the abrasive grains of the grindstone 20 is, for example, 20 μm to 40 μm, preferably 10 μm to 20 μm. D50 is a particle size that corresponds with a cumulative number of 50% in the distribution of particle size. The distribution of particle size is measured with a laser diffraction-type particle size distribution meter.

Figure 6E:
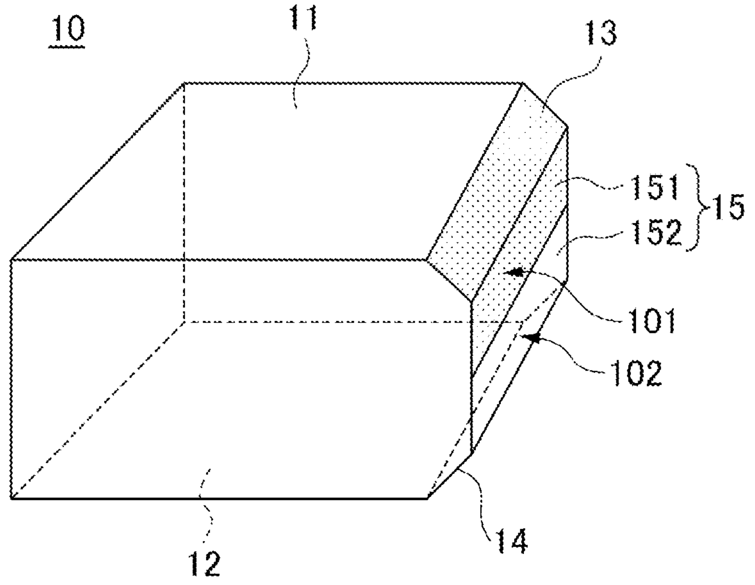
FIG. 6E is a perspective view that shows a glass plate obtained after S5 in FIG. 5.

After S5 in FIG. 5, the glass plate 10 shown in FIG. 6E is obtained. The glass plate 10 has the first main surface 11, the second main surface 12, the first inclined surface 13, the second inclined surface 14, and the end surface 15. The end surface 15 includes the first end surface portion 151, which is the first main surface 11 side with respect to the center of the plate's thickness, and the second end surface portion 152, which is the second main surface 12 side.

The first inclined surface 13 is roughened with the grindstone 20. Consequently, the arithmetic average roughness Ra of the first inclined surface 13 is, for example, 0.1 μm or greater, preferably 0.2 μm or greater. The arithmetic average roughness Ra of the first inclined surface 13 is, for example, 5 μm or less, preferably 3 μm or less.

Meanwhile, the second inclined surface 14 is not roughened with the grindstone 20. Consequently, the arithmetic average roughness Ra of the second inclined surface 14 is, for example, less than 0.1 μm, preferably 50 nm or less, and more preferably 10 nm or less. The arithmetic average roughness Ra of the second inclined surface 14 is, for example, 1 nm or greater, preferably 2 nm or greater.

The side surface of the glass plate 10 shown in FIG. 6E is divided, with respect to the center of the plate's thickness, into a rough surface 101 where the surface roughness Ra is 0.1 μm or greater, and a mirror surface 102 where the surface roughness Ra is less than 0.1 μm. The rough surface 101 has the first inclined surface 13, and the first end surface portion 151 following the first inclined surface 13. On the other hand, the mirror surface 102 has the second inclined surface 14, and the second end surface portion 152 following the second inclined surface 14. As described above, the first inclined surface 13 is roughened with the grindstone 20.

Note that the first inclined surface 13 is obtained by forming the first crack CR 1 in S2 of FIG. 5 and then by grinding the first inclined surface 13 in S5 of FIG. 5, but the first inclined surface 13 may be obtained by other methods as well. For example, in S2 of FIG. 5, only the second crack CR 2 may be formed, without forming the first crack CR 1. In this case, the first inclined surface 13 is obtained by grinding the right angle formed by the first main surface 11 and the first end surface portion 151 with a grindstone in S5 of FIG. 5.

Note that the first end surface portion 151 is not ground in S5 of FIG. 5, but may be ground in S5 of FIG. 5. In the latter case, a step may be formed between the first end surface portion 151 and the second end surface portion 152.

The glass plate 10 shown in FIG. 6E is suitable for use as a cover glass for an in-vehicle display. The glass plate 10 is installed inside a vehicle with the first main surface 11 facing the passengers in the vehicle. An antireflection film is formed in advance on the first main surface 11 and the first inclined surface 13.

The antireflection film suppresses the reflection of light, and is obtained by, for example, alternately stacking a high refractive index layer and a low refractive index layer, having a lower refractive index than the high refractive index layer. The material of the high refractive index layer is, for example, niobium oxide, titanium oxide, zirconium oxide, tantalum oxide or silicon nitride. On the other hand, the material of the low refractive index layer is, for example, silicon oxide, a mixed oxide of Si and Sn, a mixed oxide of Si and Zr, or a mixed oxide of Si and Al.

When the passengers of the vehicle hit the first main surface 11, compressive stress works on the first main surface 11 side, and tensile stress works on the second main surface 12 side, with respect to the center of the thickness of the glass plate 10. Consequently, of the side surfaces of the glass plate 10, compressive stress works on the rough surface 101, and tensile stress works on the mirror surface 102.

According to the present embodiment, since tensile stress works on the mirror surface 102, greater strength is achieved than when tensile stress works on the rough surface 101. This is because the mirror surface 102 has smaller irregularities, which are the starting points of fracture, than the rough surface 101 does. Note that, in general, materials fracture by tensile stress, rather than by compressive stress, and therefore compressive stress working on the rough surface 101 is not an issue.

Furthermore, according to the present embodiment, the first inclined surface 13 is the rough surface 101. Therefore, compared to the case where the first inclined surface 13 is the mirror surface 102, it is possible to prevent the antireflection film on the first inclined surface 13 from looking iridescent due to interference of light.

Third Embodiment

Figure 7:
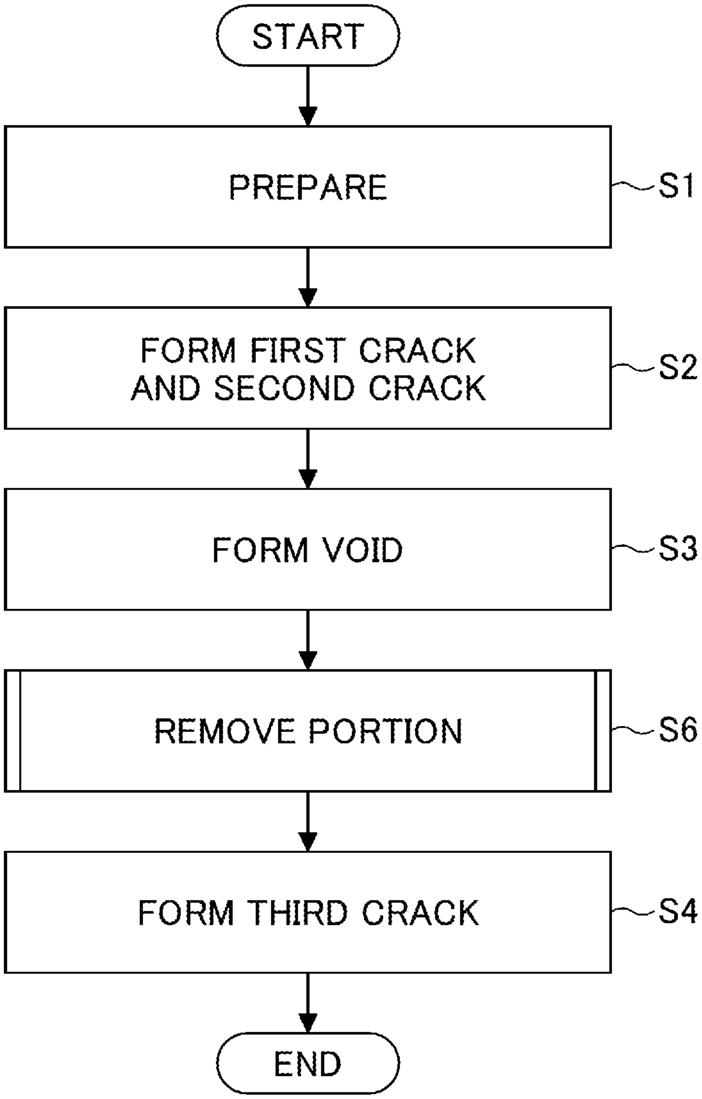
FIG. 7 is a flowchart that shows a glass plate processing method according to a third embodiment.

Now, as shown in FIG. 7, the glass plate processing method may further include S6, in addition to S1 to S4. Note that the timing to perform S6 is not limited to the timing shown in FIG. 7, and S6 may be performed, for example, between S1 and S2, or between S2 and S3. Now, S2 to S4 and S6 of FIG. 7 will be described below with reference to FIGS. 9A to 9I. Note that S1 in FIG. 7 is the same as S1 in FIG. 1, and therefore its description will be omitted here. Note that S4 in FIG. 7 may be followed by S5 in FIG. 5.

Figure 9A:
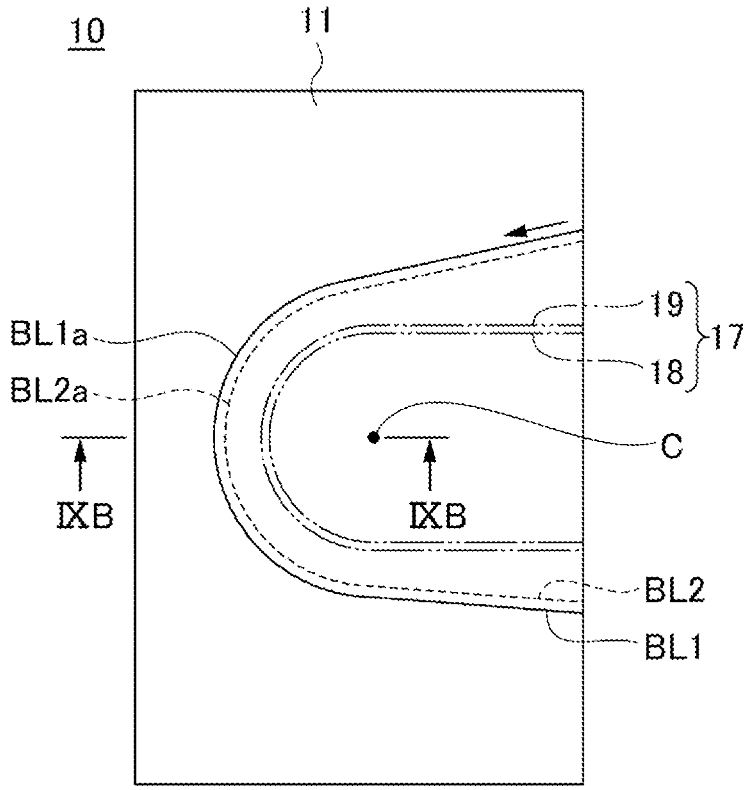
FIG. 9A is a plan view that shows S2 of FIG. 7.
Figure 9B:
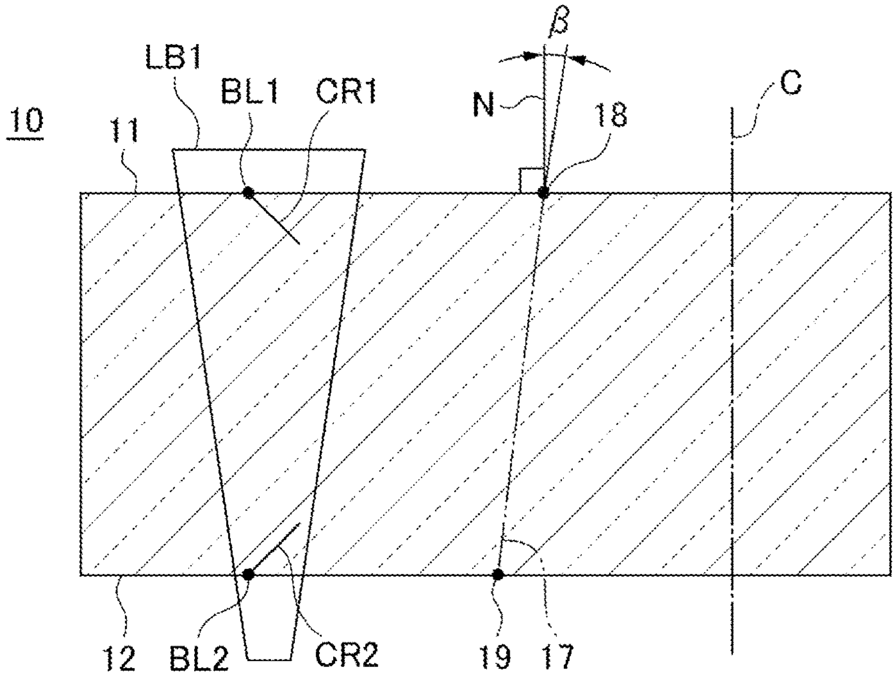
FIG. 9B is a cross-sectional view taken along line IXB-IXB in FIG. 9A.

First, as shown in FIG. 9B, in S2 of FIG. 7, the irradiation point of the first laser beam LB 1 is moved along the first separation line BL 1 to form the first crack CR 1 and the second crack CR 2.

As shown in FIG. 9A, the first separation line BL 1 has a curved portion BL 1*a* in plan view. The second separation line BL 2 also has a curved portion BL 2*a* like the first separation line BL 1.

As shown in FIG. 9B, in the cross-section orthogonal to the first separation line BL 1, the deeper the depth from the first main surface 11, the more inclined the first crack CR 1 is towards the center of curvature C of the curved portion BL 1*a*. Similarly, in the cross-section orthogonal to the second separation line BL 2, the deeper the depth from the first main surface 11, the more inclined the second crack CR 2 is towards the curvature center C.

Figure 9C:
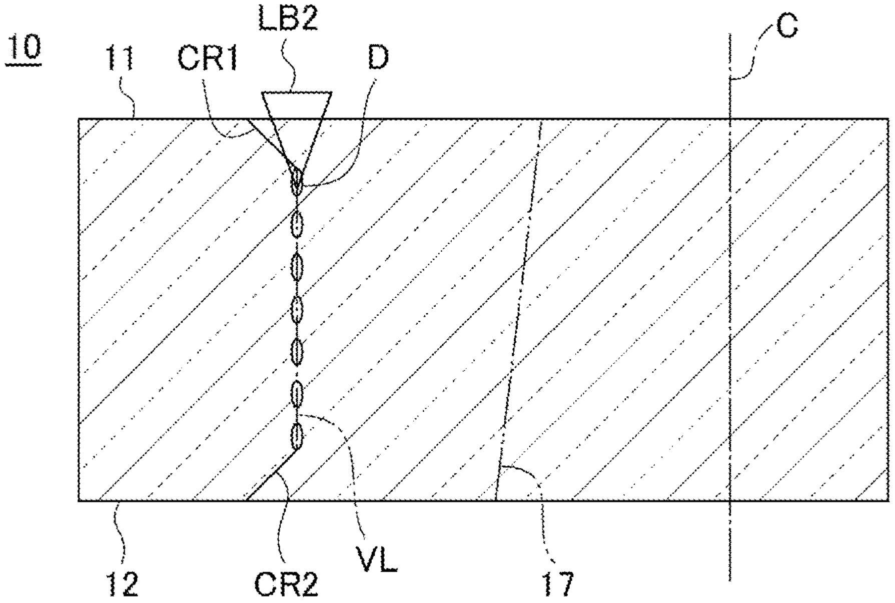
FIG. 9C is a cross-sectional view that shows S3 of FIG. 7.

Next, as shown in FIG. 9C, in S3 of FIG. 7, the second laser beam LB 2 is focused in a dot-like shape inside the glass plate 10 to form the modified portions D in a dot-like shape. The modified portions D are aligned on a linear virtual line VL as in the second example shown in FIG. 3A, but may be aligned on a curved virtual line VL as in the third example shown in FIG. 4A.

Note that, although, as described above, in S3 of FIG. 7, the second laser beam LB 2 is focused in a dot-like shape inside the glass plate 10 to form the modified portions D in a dot-like shape, it is equally possible, similar to the first example shown in FIG. 2C, to concentrate the second laser beam LB 2 in a linear shape, and form linear modified portions D.

Next, in S6 of FIG. 7, a portion of the glass plate 10, for example, a portion of the curved portion BL 1*a* on the first separation line BL 1, including the center of curvature C, is removed from the removing surface 17 shown in FIG. 9A.

The removing surface 17 is set between the first separation line BL 1 and its center of curvature C.

As shown in FIG. 9B, the removing surface 17 has a first line of intersection 18 that intersects the first main surface 11 and a second line of intersection 19 that intersects the second main surface 12. The first line of intersection 18 has a curved portion sharing the same center of curvature C with the first separation line BL 1. As long as the first line of intersection 18 has a curved portion, the first line of intersection 18 may have more straight portions. The second line of intersection 19 also has a curved portion like the first line of inter section 18 does.

Figure 9D:
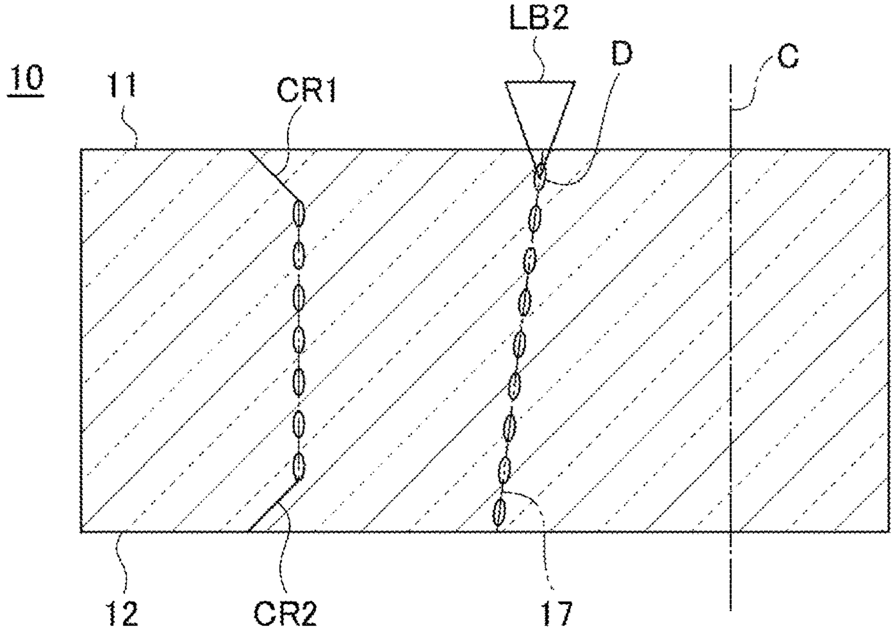
FIG. 9D is a cross-sectional view that shows S6 of FIG. 7, and, more specifically, S61 of FIG. 8.

As shown in FIG. 9A, the first line of intersection 18 is arranged on one side of the second line of intersection 19 in plan view. To be more specific, for example, the first line of intersection 18 is arranged on the side of the curvature center C with respect to the second line of intersection 19. Note that the arrangement of the first line 18 and the second line 19 may be opposite, and the second line of intersection 19 may be arranged on the side of the curvature center C with respect to the first line of intersection 18. As shown in FIG. 9B, in the cross-section orthogonal to the first line of intersection 18, the removing surface 17 is inclined towards the normal N to the first main surface 11. The removing surface 17 is, for example, a linear taper. The angle β formed by the normal N to the first main surface 11 and the removing surface 17 is, for example, 3 degrees or more. If β is 3 degrees or more, a portion of the glass plate 10 can be removed in the direction normal to the first main surface 11, as shown in FIG. 9F, which will be described later in detail. β is, for example, 45 degrees or less.

Note that the removing surface 17 is a linear taper in this embodiment, but may be a non-linear taper as well. In that case, β would be the angle formed between the normal N to the first main surface 11 and the tangent to the removing surface 17. It suffices if β is in the above range.

Figure 8:
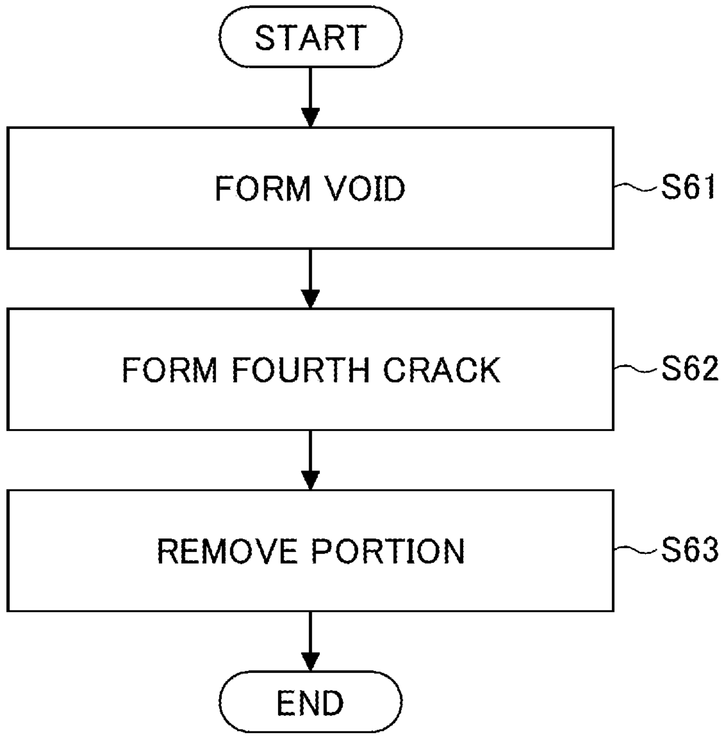
FIG. 8 is a flowchart that shows S6 of FIG. 7.

S6 in FIG. 7 includes S61 to S63 shown in FIG. 8. First, in S61 of FIG. 8, as shown in FIG. 9D, the second laser beam LB 2 is focused in a dot-like shape inside the glass plate 10 to form a dot-like modified portion D at this beam focal point.

A distribution of modified portions D is arranged on the removing surface 17 by repeating moving the beam focal point two-dimensionally within a plane at a certain depth from the first main surface 11 and changing the depth of the beam focal point from the first main surface 11. The beam focal point is moved by using, for example, a 3D galvano scanner. If the depth of the beam focal point is changed by moving the stage, a 2D galvano scanner may be used.

The stage holds the glass plate 10. The beam focal point may be moved by moving or rotating the stage holding the glass plate 10. For the stage, for example, an XY stage, an XYθ stage, an XYZ stage, or an XYZθ stage is used.

The modified portions D are formed across the entirety of the plate's thickness direction, from the first main surface 11 to the second main surface 12. Here, the entirety of the plate's thickness direction means covering 80% or more of the region of the plate's thickness. In S62, which will be described later, a fourth crack CR 4 can be formed across the entirety of the plate's thickness direction.

Figure 9E:
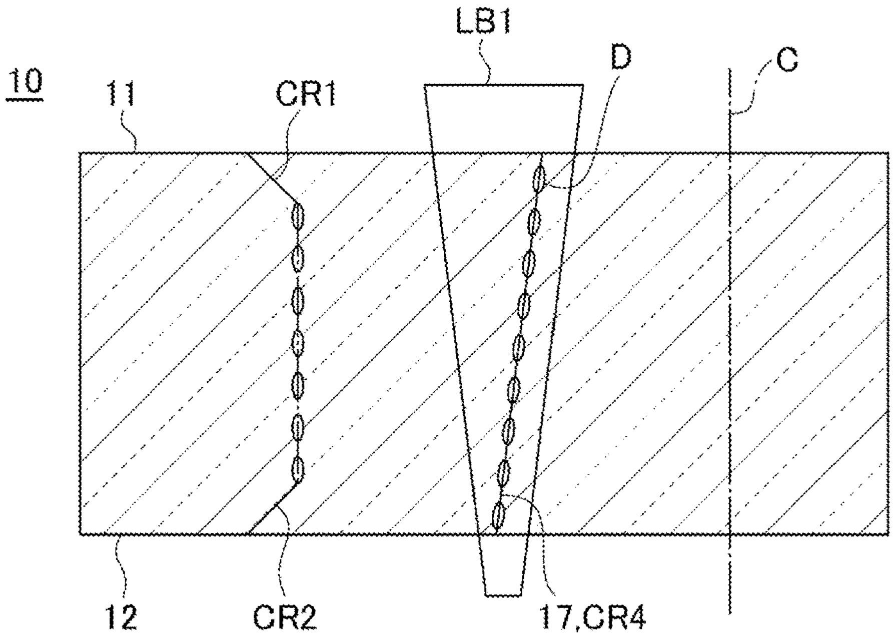
FIG. 9E is a cross-sectional view that shows S6 of FIG. 7, and, more specifically, S62 of FIG. 7.
Figure 9F:
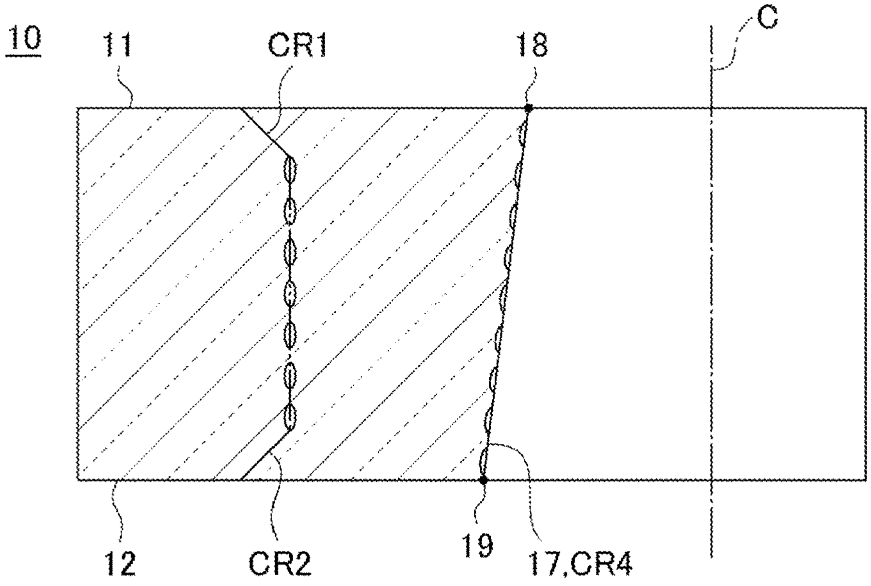
FIG. 9F is a cross-sectional view that shows S6 of FIG. 7, and, more specifically, S63 of FIG. 8.

Next, as shown in FIG. 9E, in S62 of FIG. 8, stress is applied to the glass plate 10 to form the fourth crack CR 4 on the removing surface 17. The fourth crack CR 4 is formed starting from a modified portion D, and formed from the first main surface 11 to the second main surface 12.

To form the fourth crack CR 4, thermal stress is applied to the glass plate 10 by, for example, emitting the first laser beam LB 1. Note that the method of applying stress to the glass plate 10 is not particularly limited. It is equally possible to press a roller against the glass plate 10 and apply stress to the glass plate 10.

Finally, in S63 of FIG. 8, as shown in FIG. 9F, a portion of the glass plate 10, which may be, for example, a portion to include the center of curvature C, is removed. Upon the removal, that portion of the glass plate 10 and the remaining portion of the glass plate 10 are shifted in the direction normal to the first main surface 11. By this means, it is possible to remove a portion of the glass plate 10 without crushing both that portion and the remaining portion of the glass plate 10.

Note that, before the portion and the remaining portion of the glass plate 10 are shifted in the direction normal to the first main surface 11, a difference in temperature may be produced between the portion and the remaining portion of the glass plate 10, and a gap may be created between the portion and the remaining portion of the glass plate 10. This makes it possible to prevent these portions of the glass plate 10 from rubbing against each other.

A gap can be created as long as, with respect to the first line of intersection 18, the portion on the curvature center C side has a lower temperature than the portion on the opposite side of the curvature center C. It is possible to cool the portion on the curvature center C side, or heat the portion on the opposite side of curvature center C.

The remaining portion of the glass plate 10 is the portion to include the first crack CR 1 and the second crack CR 2. By removing a portion of the glass plate 10 thus, the remaining portion of the glass plate 10 can be deformed with ease, which makes the subsequent processes easy.

Figure 9G:
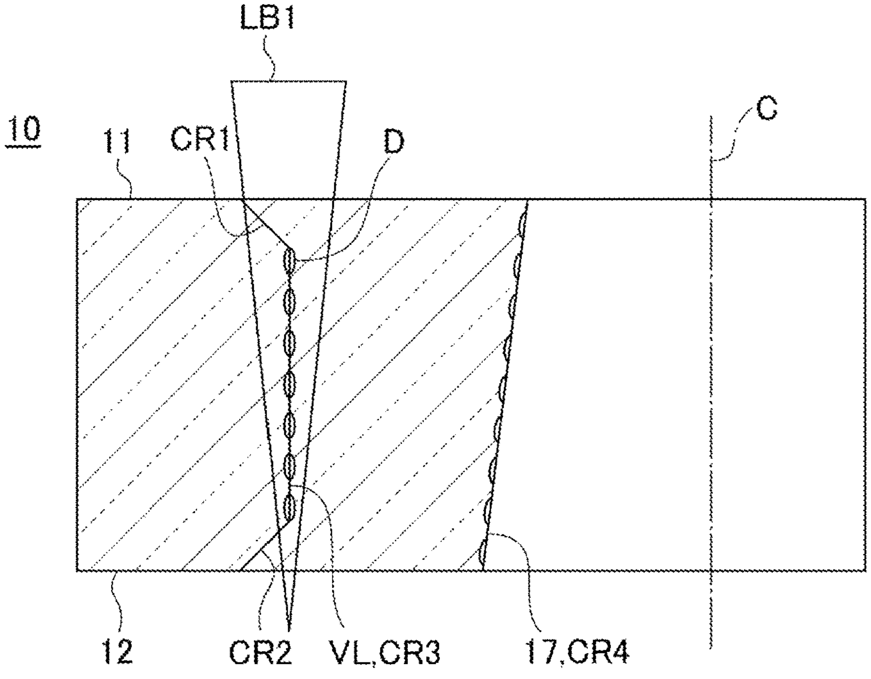
FIG. 9G is a cross-sectional view that shows an example of S4 in FIG. 7.

Next, as shown in FIG. 9G, in S4 of FIG. 7, stress is applied to the glass plate 10 to form the third crack CR 3 that spans from the tip of the first crack CR 1 to the modified portions D. As a result of this, the third crack CR 3 spans from the tip of the first crack CR 1 to the tip of the second crack CR 2.

According to the present embodiment, similarly to the first embodiment and the second embodiment, the modified portions D are formed on the virtual line VL before the third crack CR 3 is formed. The modified portions D guide the third crack CR 3 to the virtual line VL. Therefore, it is possible to create the third crack CR 3, from the tips of the first crack CR 1 and the second crack CR 2, in a direction that is perpendicular to the first main surface 11 and the second main surface 12.

Also, according to this embodiment, as shown in FIG. 9A, the first separation line BL 1 has a curved portion BL 1*a* in plan view, and multiple modified portions D are aligned along the curved portion BL 1*a*. The third crack CR 3 can be guided in the direction of that alignment.

Also, according to this embodiment, as shown in FIG. 9B, in a cross-section that is orthogonal to the first separation line BL 1, the deeper the depth from the first main surface 11, the more inclined the first crack CR 1 is towards the center of curvature C of the curved portion BL 1*a*. The portion on the opposite side of the center of curvature C with respect to the curved portion BL 1*a* (the portion on the left side of the curved portion BL 1*a* in FIG. 9A) becomes the product.

When the portion on the opposite side of the curvature center C with respect to the curved portion BL 1*a* becomes the product, aligning multiple modified portions D in the curved portion BL 1*a* and guiding the third crack CR 3 in the direction of that alignment carries a great technical significance. This is because, if, at a certain point in the curved portion BL 1*a*, the third crack CR 3 develops straight in the tangential direction, the third crack CR 3 might end up impairing the product.

The radius of curvature of the curved portion BL 1*a* is, for example, 0.5 mm or greater, preferably 1 mm or greater, so that the third crack CR 3 can bend along the curved portion BL 1*a* with greater ease. Also, the radius of curvature of the curved portion BL 1*a* is, for example, 1000 mm or less, preferably 500 mm or less.

Figure 9H:
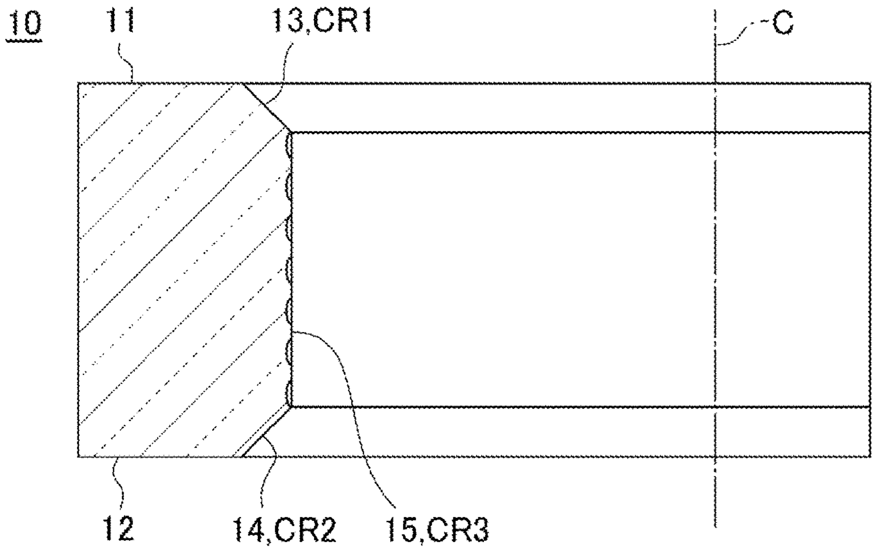
FIG. 9H is a cross-sectional view that shows a glass plate obtained after S4 in FIG. 7, and is a cross-sectional view taken along line IXH-IXH in FIG. 9I.
Figure 9I:
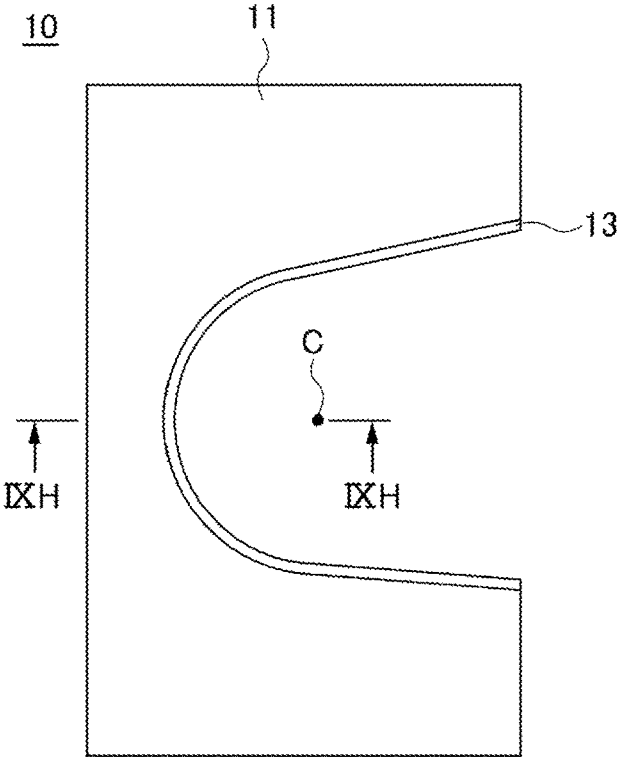
FIG. 9I is a plan view that shows a glass plate obtained after S4 in FIG. 7.

After S4 in FIG. 7, the unnecessary portion from the third crack CR 3 to the fourth crack CR 4, shown in FIG. 9G, is removed. For example, a laser beam may be emitted onto the unnecessary portion, and the unnecessary portion may be crushed into pieces by heat and removed thereby. As a result of this, the glass plate 10 shown in FIGS. 9H and 9I is obtained. The glass plate 10 has the first main surface 11, the second main surface 12, the first inclined surface 13, the second inclined surface 14, and the end surface 15. Note that, to remove the unnecessary portion, cooling contracture may be used instead of crushing by heat.

EXAMPLES

Below, specific examples of the glass plate processing method according to the present disclosure will be described.

Example 1

With Example 1, S1 to S4 in FIG. 1 were carried out. In S1, soda lime glass having a thickness of 1.8 mm was prepared as the glass plate 10. The first main surface 11 was a rectangle with a length of 100 mm and a width of 50 mm. The first separation line BL 1 was a straight line extending from one long side of the first main surface 11 diagonally with respect to the other long side.

In S2, as shown in FIG. 2B, the irradiation point of the first laser beam LB 1 was moved along the first separation line BL 1 to form the first crack CR 1 and the second crack CR 2. The irradiation point was moved by using a 3D galvano scanner.

The conditions of irradiation of the laser beam LB 1 in S2 were as follows:

Oscillator: Yb fiber laser (YLR500 manufactured by IPG Photonics)
Oscillation mode: continuous wave oscillation
Beam wavelength: 1070 nm
Output: 440 W
In-plane scanning speed: 70 mm/s
Beam diameter on the first main surface 11: 0.6 mm In S3, as shown in FIG. 2C, the second laser beam LB 2 was concentrated in a linear shape inside the glass plate 10 to form the modified portions D in a linear shape. The irradiation point of the second laser beam LB 2 was moved along the first separation line BL 1 to form multiple modified portions D at a predetermined pitch along the first separation line BL 1. The irradiation point was moved by using an XYZ stage.

The conditions of irradiation of the second laser beam LB 2 in S3 were as follows:

Oscillator: Picosecond pulsed laser (StarPico3 manufactured by Rofin)
Oscillation mode: Pulse oscillation (burst)
Beam wavelength: 1064 nm
Output: 35.6 W
Oscillation frequency: 75 kHz
In-plane scanning speed: 187.5 mm/s
In-plane irradiation pitch: 5 μm
Pulse energy: 475 μJ In S4, as shown in FIG. 2D, stress was applied to the glass plate 10 to form the third crack CR 3 that spans from the tip of the first crack CR 1 to the tip of the second crack CR 2. To create the third crack CR 3, thermal stress was applied to the glass plate 10 by emitting the first laser beam LB 1. The irradiation point of the first laser beam LB 1 was moved by using an XYZ stage. The conditions of irradiation of the first laser beam LB 1 in S4 were the same as those of the first laser beam LB 1 in S2.

After S4, the glass plate 10 shown in FIG. 2E was obtained. The arithmetic average roughness Ra of the first inclined surface 13, the second inclined surface 14, and the end surface 15 of the glass plate 10 was measured by using a surface roughness measuring instrument (DektakXT manufactured by Bruker). The conditions of measurement were as follows:

Cut-off value λc: 0.025 mm
Cut-off ratio λc/λs: 10
Measurement speed: 0.1 mm/sec
Evaluation duration: 1.0 mm The arithmetic average roughness Ra of the first inclined surface 13 was 5.2 nm. The arithmetic average roughness Ra of the second inclined surface 14 was also 5.2 nm. Meanwhile, the arithmetic average roughness Ra of the end surface 15 was 0.4 μm.

Example 2

In Example 2, S1 to S5 of FIG. 5 were carried out. In S1, aluminosilicate glass having a thickness of 1.3 mm was prepared as the glass plate 10. The first main surface 11 was a rectangle with a length of 100 mm and a width of 50 mm. The first separation line BL 1 was a straight line extending from one long side of the first main surface 11 diagonally with respect to the other long side.

In S2, as shown in FIG. 2B, the irradiation point of the first laser beam LB 1 was moved along the first separation line BL 1 to form the first crack CR 1 and the second crack CR 2. The irradiation point was moved by using a 3D galvano scanner.

The conditions of irradiation of the laser beam LB 1 in S2 were as follows:

Oscillator: Yb fiber laser (YLR500 manufactured by IPG Photonics)
Oscillation mode: continuous wave oscillation
Beam wavelength: 1070 nm
Output: 440 W
In-plane scanning speed: 70 mm/s
Beam diameter on the first main surface 11: 0.6 mm In S3, as shown in FIG. 6A, the second laser beam LB 2 was focused in a dot-like shape inside the glass plate 10 to form modified portions D in a dot-like shape. The modified portions D were formed only on the first main surface 11 side with respect to the center of the thickness of the glass plate 10. The beam focal point was moved by using an XYZ stage.

The conditions of irradiation of the second laser beam LB 2 in S3 were as follows.

Oscillator: Nanosecond pulsed laser (Explorer 532-2Y manufactured by Spectraphysics)
Oscillation mode: Pulse oscillation (single)
Beam wavelength: 532 nm
Output: 2 W
Oscillation frequency: 10 kHz
Scanning speed in in-plane direction: 100 mm/s In-plane irradiation pitch: 0.01 mm
Pitch of irradiation in the depth direction: 0.05 mm
Focused beam diameter: 4 μm
Pulse energy: 200 μJ In S4, as shown in FIG. 6B, stress was applied to the glass plate 10 to form the third crack CR 3 that spans from the tip of the first crack CR 1 to the tip of the second crack CR 2. To form the third crack CR 3, thermal stress was applied to the glass plate 10 by emitting the first laser beam LB 1. The irradiation point of the first laser beam LB 1 was moved by using an XYZ stage. The conditions of irradiation of the first laser beam LB 1 in S4 were the same as those of the first laser beam LB 1 in S2.

In S5, as shown in FIG. 6D, the first inclined surface 13 was ground with a grindstone 20 to make the surface rough. The average particle size D50 of the abrasive grains of the grindstone 20 was 40 μm.

After S5, the glass plate 10 shown in FIG. 6E was obtained. The arithmetic average roughness Ra of the first inclined surface 13 was 0.5 μm. The arithmetic average roughness Ra of the first end surface portion 151 in the end surface 15 was 2.1 μm. Meanwhile, the arithmetic average roughness Ra of the second end surface portion 152 in the end surface 15 was 2.9 nm. The arithmetic average roughness Ra of the second inclined surface 14 was 5.2 nm.

For the glass plate 10 shown in FIG. 6E, a test piece for a four-point bending test was prepared, and a four-point bending test was conducted. In the four-point bending test, compressive stress was produced on the first main surface 11, and tensile stress was produced on the second main surface 12. As a result of that, the breaking strength was 248 MPa. Also, it was confirmed that the starting point of destruction was the second main surface 12, not the second inclined surface 14 or the second end surface portion 152.

Example 3

In Example 3, S1 to S4 and S6 in FIG. 7 were carried out. In S1, soda lime glass having a thickness of 3.5 mm was prepared as the glass plate 10. The first main surface 11 was a rectangle with a length of 200 mm and a width of 150 mm. The curved portion BL 1*a* of the first separation line BL 1 was an arc with a radius of 80 mm. The angle β formed by the normal to the first main surface 11 and the removing surface 17 was 4 degrees.

In S2, as shown in FIGS. 9A and 9B, the irradiation point of the first laser beam LB 1 was moved along the first separation line BL 1 to form the first crack CR 1 and the second crack CR 2. The irradiation point was moved by using an XYZ stage.

The conditions of irradiation of the laser beam LB 1 in S2 were as follows:

Oscillator: Yb fiber laser (YLR500 manufactured by IPG Photonics)
Oscillation mode: continuous wave oscillation
Beam wavelength: 1070 nm
Output: 220 W
In-plane scanning speed: 70 mm/s
Beam diameter on the first main surface 11: 1.2 mm The second laser beam LB 2 is focused in a dot-like shape inside the glass plate 10 to form a modified portion D in a dot-like shape. A distribution of modified portions D was arranged on the removing surface 17 by repeating moving the beam focal point two-dimensionally within a plane at a certain depth from the first main surface 11 and changing the depth of the beam focal point from the first main surface 11. The beam focal point was moved by using an XYZ stage.

The conditions of irradiation of the second laser beam LB 2 in S3 were as follows:

Oscillator: nanosecond pulsed laser (Explorer 532-2Y manufactured by Spectraphysics)
Oscillation mode: pulse oscillation (single)
Beam wavelength: 532 nm
Output: 2 W
Oscillation frequency: 10 kHz
In-plane scanning speed: 100 mm/s
In-plane irradiation pitch: 0.01 mm
Pitch of irradiation in the depth direction: 0.05 mm
Focused beam diameter: 4 μm
Pulse energy: 200 μJ.

In S61 included in S6, as shown in FIG. 9D, the second laser beam LB 2 was focused in a dot-like shape inside the glass plate 10 to form a dot-like modified portion D at this beam focal point. A distribution of modified portions D was arranged on the removing surface 17 by repeating moving the beam focal point two-dimensionally within a plane at a certain depth from the first main surface 11 and changing the depth of the beam focal point from the first main surface 11. The beam focal point was moved by using an XYZ stage. The conditions of irradiation of the second laser beam LB 2 in S61 were the same as those of the second laser beam LB 2 in S3.

In S62 included in S6, as shown in FIG. 9E, stress was applied to the glass plate 10 to form the fourth crack CR 4 on the removing surface 17. To form the fourth crack CR 4, thermal stress was applied to the glass plate 10 by emitting the first laser beam LB 1. The first laser beam LB 1 was emitted on the first main surface 11 with an optical system including a condenser lens and the like. By moving the irradiation point along the first line of intersection 18, the fourth crack CR 4 was formed across the entirety of the removing surface 17. The irradiation point was moved by using a 3D galvano scanner. The conditions of irradiation of the first laser beam LB 1 in S62 were the same as those of the first laser beam LB 1 in S2 except that the output was increased to 340 W.

In S63 included in S6, as shown in FIG. 9F, a portion of the glass plate 10 was removed. The portion of the glass plate 10 was a portion to include the center of curvature C, and the remaining portion of the glass plate 10 was a portion to include the first crack CR 1 and the second crack CR 2.

In S4, as shown in FIG. 9G, stress was applied to the glass plate 10 to form the third crack CR 3 that spans from the tip of the first crack CR 1 to the tip of the second crack CR 2. To form the third crack CR 3, thermal stress was applied to the glass plate 10 by emitting the first laser beam LB 1. The irradiation point of the first laser beam LB 1 was moved by using a 3D galvano scanner. The conditions of irradiation of the first laser beam LB 1 in S4 were the same as those of the first laser beam LB 1 in S2, except that the output was increased to 340 W.

After S4 in FIG. 7, the first laser beam LB 1 was emitted onto the unnecessary portion, from the third crack CR 3 to the fourth crack CR 4, shown in FIG. 9G, and the unnecessary portion was crushed into pieces by heat and removed thereby. Thereupon the conditions of irradiation of the first laser beam LB 1 were the same as those of the first laser beam LB 1 in S2, except that the output was increased to 460 W and the in-plane scanning speed was reduced to 10 mm/s. After crushing the unnecessary portion, the glass plate 10 shown in FIGS. 9H and 9I was obtained.

Although the glass plate processing method and the glass plate according to the present disclosure have been described above, the present disclosure is by no means limited to the above-described embodiments. Various changes, alterations, replacements, additions, deletions, and combinations are possible within the scope of the following claims, and will obviously belong to the technical scope of the present disclosure.

What is claimed is:

1. A glass plate processing method for dividing a glass plate by a separation line that divides a main surface of the glass plate into two regions, the method comprising:

forming a crack that extends from the separation line diagonally with respect to the main surface, in a cross-section that is orthogonal to the separation line by moving upon the glass plate, along the separation line, an irradiation point of a first laser beam having a power density converted from a first photon density that is less than $1\times10^8$ W/cm$^2$;

after the crack is formed, forming a modified portion in the cross-section, on a virtual line that extends in a direction perpendicular to the main surface, from a tip of the crack towards a center of a thickness of the glass plate by moving upon the glass plate, along the separation line, an irradiation point of a second laser beam having a power density converted from a second photon density that is greater than $1\times10^8$ W/cm$^2$, the second photon density is a density of a pulse laser beam having a width of 1000 nm or less; and after the modified portion is formed, applying stress to the glass plate and forming a new crack that spans from the tip of the crack to the modified portion.

2. The processing method according to claim 1, wherein the separation line includes a curved portion in plan view.

3. The processing method according to claim 2, wherein a radius of curvature of the curved portion is 0.5 mm or greater and 1000 mm or less.

4. The processing method according to claim 2, wherein, in the cross-section, the crack inclines at a constant angle towards a center of curvature of the curved portion.

5. The processing method according to claim 1, wherein the second laser beam is concentrated in a linear shape to form the modified portion in the linear shape.

6. The processing method according to claim 1, wherein the second laser beam is focused in a dot shape to form the modified portion in the dot-like shape.

7. The processing method according to claim 1, wherein the crack is formed on each of two main surfaces by the irradiation of the first laser beam.

8. The processing method according to claim 1, further comprising grinding, with a grindstone, at least one of:

the crack, formed by the irradiation of the first laser beam and extending diagonally with respect to the main surface; and a right angle formed by the main surface and an end surface portion created by the modified portion.

9. The processing method according to claim 1, further comprising:

forming a plurality of modified portions on only one side of a center of a thickness of the glass plate by using the second laser beam; and grinding, with a grindstone, an inclined surface created by the crack on the one side of the center of the thickness of the glass plate.

10. The processing method according to claim 8, further comprising grinding the end surface portion with the grindstone.

* * * * *